(12) United States Patent
Park et al.

(10) Patent No.: US 11,350,040 B2
(45) Date of Patent: May 31, 2022

(54) ELECTRONIC DEVICE FOR CONTROLLING CAMERA ON BASIS OF EXTERNAL LIGHT, AND CONTROL METHOD THEREFOR

(71) Applicant: Samsung Electronics Co., Ltd., Suwon-si (KR)

(72) Inventors: Byeong-Hoon Park, Suwon-si (KR); Yong-Chan Keh, Seoul (KR); Sung-Soon Kim, Seoul (KR); Yong-Kwan Kim, Suwon-si (KR); Ki-Suk Sung, Yongin-si (KR); Dong-Hi Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 16/650,191

(22) PCT Filed: Sep. 19, 2018

(86) PCT No.: PCT/KR2018/011068
§ 371 (c)(1),
(2) Date: Mar. 24, 2020

(87) PCT Pub. No.: WO2019/066370
PCT Pub. Date: Apr. 4, 2019

(65) Prior Publication Data
US 2020/0280668 A1 Sep. 3, 2020

(30) Foreign Application Priority Data
Sep. 26, 2017 (KR) .......................... 10-2017-0124467

(51) Int. Cl.
*H04N 5/235* (2006.01)
*H04N 13/254* (2018.01)
(Continued)

(52) U.S. Cl.
CPC ......... *H04N 5/2353* (2013.01); *H04N 5/2351* (2013.01); *H04N 5/2352* (2013.01);
(Continued)

(58) Field of Classification Search
CPC .................................................... H04N 5/2353
(Continued)

(56) References Cited

U.S. PATENT DOCUMENTS 5,847,758 A 12/1998 Iizuka
2011/0234893 A1 9/2011 Koseki
(Continued)

FOREIGN PATENT DOCUMENTS

KR   10-2009-0097416 A   9/2009
KR   10-2013-0024312 A   3/2013
(Continued)

OTHER PUBLICATIONS

Korean Office Action with English translation dated Nov. 29, 2021; Korean Appln. No. 10-2017-0124467.

*Primary Examiner* — Joel W Fosselman
(74) *Attorney, Agent, or Firm* — Jefferson IP Law, LLP

(57) ABSTRACT

When a three-dimensional image of a specific subject is acquired by means of an infrared camera and an external light (for example, external light such as sunlight at the time of outdoor photography) having a relatively large intensity exists, it is difficult to acquire the image. To this end, the present invention proposes an electronic device for reducing a current peak by adaptively changing optical power and an exposure time of an infrared camera according to the intensity of external light.

19 Claims, 17 Drawing Sheets

(51) Int. Cl.
*H04N 13/271* (2018.01)
*H04N 13/239* (2018.01)

(52) U.S. Cl.
CPC ......... *H04N 13/239* (2018.05); *H04N 13/254* (2018.05); *H04N 13/271* (2018.05)

(58) Field of Classification Search
USPC .......................................................... 348/362
See application file for complete search history.

(56) References Cited

U.S. PATENT DOCUMENTS

| | | |
|---|---|---|
| 2014/0022348 A1 | 1/2014 | Shpunt |
| 2015/0304638 A1 | 10/2015 | Cho et al. |
| 2015/0326836 A1 | 11/2015 | Shin et al. |
| 2016/0307325 A1 | 10/2016 | Wang et al. |
| 2016/0373628 A1 | 12/2016 | Nakajima |
| 2016/0373633 A1* | 12/2016 | Grau ....................... G01S 17/06 |

FOREIGN PATENT DOCUMENTS

| | | |
|---|---|---|
| KR | 10-2014-0066638 A | 6/2014 |
| KR | 10-1502122 B1 | 3/2015 |
| KR | 10-2015-0127923 A | 11/2015 |
| KR | 10-2016-0124669 A | 10/2016 |
| KR | 10-1760378 B1 | 7/2017 |
| WO | 99/09603 A1 | 2/1999 |

\* cited by examiner

|  | 850nm camera | 940nm camera |
|---|---|---|
| Resolution | 640x480 | 640x400 |
| Field Size [mm] | 2.4 | 4.53 |
| Pixel [um] | 3 | 6 |
| Lens F/# | 1.7 | 2.4 |
| Quantum Eff. | 0.32 | 0.12 |
| Relative Sensitivity | 11.1 | 8.3 |
| Normalized RS | 1.0 | 0.75 |

FIG.4

| ILLUMINANCE OF EXTERNAL LIGHT (Klux) | CRITICAL EXPOSURE TIME (msec) | OPTICAL POWER (w) | EXPOSURE TIME (msec) |
|---|---|---|---|
| 5 | 6.00 | 2.80 | 0.75 |
| 10 | 5.80 | 2.70 | 0.83 |
| 20 | 5.60 | 2.40 | 0.99 |
| 30 | 5.40 | 2.35 | 1.03 |
| 40 | 5.20 | 2.63 | 0.89 |
| 50 | 5.00 | 2.90 | 0.59 |
| 60 | 4.80 | 3.00 | 0.50 |

FIG. 7A

ELECTRONIC DEVICE FOR CONTROLLING CAMERA ON BASIS OF EXTERNAL LIGHT, AND CONTROL METHOD THEREFOR

CROSS-REFERENCE TO RELATED APPLICATION(S)

This application is a National Phase Entry of PCT International Application No. PCT/KR2018/011068, which was filed on Sep. 19, 2018, and claims priority to Korean Patent Application No. 10-2017-0124467, which was filed in the Korean Intellectual Property Office on filed on Sep. 26, 2017, the entire disclosure of each of these applications is incorporated herein by reference.

TECHNICAL FIELD

The disclosure relates to an electronic device for controlling a camera based on external light and a control method thereof.

BACKGROUND ART

In order to acquire a three-dimensional image of an object (in other words, a subject), in addition to a planar image acquired by an existing two-dimensional camera, depth information of the object is further needed. A method for acquiring a three-dimensional image may be a passive stereo camera scheme, an active Time-of-Flight (ToF) scheme, a structured light scheme, or the like. The ToF scheme corresponds to a method for acquiring a three-dimensional image based on the traveling speed of light and the time of flight. The structured light scheme corresponds to a method in which an already-known pattern is projected onto a space and a three-dimensional image is acquired by applying a triangulation technique based on the difference between patterns deformed by particular objects.

In order to generate a signal light in the form of a short pulse, an active depth camera employing the ToF scheme may include: an infrared illuminator including an infrared light source and a diffuser; and a CMOS/CCD sensor configured to detect the signal light. The structured light scheme uses an infrared light source identically to the ToF scheme. However, the structured light scheme: may include an IR projector including a pattern mask configured to form an already-known particular coded pattern or a Diffractive Optical Element (DOE) configured to form a random dot; and a CMOS image sensor.

DETAILED DESCRIPTION OF THE INVENTION

Technical Problem

In the case of an active camera, when there exists external light having a relatively high intensity (e.g., external light such as sunlight during outdoor photography), it is difficult to acquire a three-dimensional image. That is, pixels of a three-dimensional image are saturated due to the external light such as sunlight, and thus it is difficult to acquire a high-definition three-dimensional image. Also, when an exposure time is reduced in order to avoid this saturation, the magnitude of output light (in other words, optical power) is reduced accordingly, and thus quality degradation caused by a reduction in a Signal-to-Noise Ratio (SNR) may occur. Further, when optical power is increased, as in a case where a camera does not operate due to a voltage drop caused by an increase in a current peak in a mobile terminal such as a smart phone, the reliability of the entire system may be degraded.

Various embodiments of the disclosure may provide an electronic device and a recording medium on which a control method thereof is recorded, wherein the electronic device is capable of reducing a current peak by adaptively changing optical power and an exposure time of an infrared camera in response to the illuminance of external light (in other words, the intensity of external light) in a mobile terminal acquiring a three-dimensional image of a particular subject by using an infrared camera.

Various embodiments of the disclosure may provide an electronic device and a recording medium on which a control method thereof is recorded, wherein the electronic device allows a camera module to be executed even in a state of having a relatively low voltage of a battery (e.g., when a state-of-charge of a battery is 15%) according to the reduction in the current peak in a mobile terminal, and thus can improve the reliability of the entire system.

Various embodiments of the disclosure may provide an electronic device and a recording medium on which a control method thereof is recorded, wherein the electronic device is capable of acquiring a three-dimensional image having the same value as an SNR depending on designated optical power, despite a current peak lower than a current peak depending on the designated optical power.

Technical Solution

In accordance with an aspect of the disclosure, an electronic device may include: a housing; a camera module, at least a part of which is exposed through the housing; a sensor module, at least a part of which is exposed through the housing; a processor configured to be disposed inside the housing and be operatively connected to the camera module and the sensor module; and at least one memory configured to be disposed inside the housing and be operatively connected to the processor, wherein the memory is configured to store instructions that, when executed, cause the processor to: while the camera module acquires an image of an object according to designated optical power and a designated exposure time, detect an intensity of external light to the electronic device by using the sensor module; determine new optical power and a new exposure time for acquisition of the image of the object based on the detected intensity of the external light; and acquire the image of the object according to the determined new optical power and new exposure time.

In accordance with another aspect of the disclosure, a computer-readable recording medium may include at least one operation including: while an electronic device acquires an image of an object according to designated optical power and a designated exposure time, detecting an intensity of external light to the electronic device by an electronic device; determining new optical power and a new exposure time for acquisition of the image of the object based on the detected intensity of the external light, by an electronic device; and acquiring the image of the object according to the determined new optical power and new exposure time by an electronic device.

In accordance with still another aspect of the disclosure, an electronic device may include: a light output unit configured to be capable of outputting light in at least partial band of infrared light; a camera configured to be capable of detecting light in the at least partial band of the infrared light which has been output from the light output unit and is reflected from an external object; a sensor unit configured to be capable of detecting an intensity of external light to the electronic device; and a processor, wherein the processor is configured to: emit, to the external object, the light in the at least partial band of the infrared light by using the light output unit; as a part of an operation of emitting the light, determine the intensity of the external light by using the sensor unit, emit light in the at least partial band of the infrared light to the external object according to first optical power based on a first condition related to the intensity of the external light, and emit light in the at least partial band of the infrared light to the external object according to second optical power based on a second condition related to the intensity of the external light; receive, by using the camera, the light in the at least partial band of the infrared light which has been reflected from the external object; as a part of an operation of receiving the light, receive light in the at least partial band of the infrared light which has been reflected from the external object, according to a first exposure time based on the emitting of the light corresponding to the first optical power, and receive light in the at least partial band of the infrared light which has been reflected from the external object, according to a second exposure time based on the emitting of the light corresponding to the second optical power; and generate depth information corresponding to the external object based on a pattern of the received light in the at least partial band of the infrared light.

ADVANTAGEOUS EFFECTS

According to various embodiments of the disclosure, an electronic device, which acquires a three-dimensional image of a particular subject by using an infrared camera, can reduce a current peak by adaptively changing optical power and an exposure time of the infrared camera in response to the illuminance of external light (in other words, the intensity of external light).

According to various embodiments of the disclosure, the electronic device allows a camera module to be executed even in a state of having a relatively low voltage of a battery (e.g., when a state-of-charge of a battery is 15%) according to the reduction in the current peak, and thus can improve the reliability of the entire system.

Various embodiments of the disclosure enable acquisition of a three-dimensional image having the same value as an SNR depending on designated optical power, despite a current peak lower than a current peak depending on the designated optical power.

Various embodiments of the disclosure can reduce Radiative Emission (RE) related to an allowed electromagnetic wave standard, due to a current peak lower than a current peak depending on the designated optical power.

Advantageous effects of the disclosure are not limited to the above-described effects, and it will be apparent to those skilled in the art that various effects are included in the specification.

BRIEF DESCRIPTION OF DRAWINGS

FIG. 4 is a view illustrating a comparison of attributes between an infrared camera having a wavelength of 850 nm and an infrared camera having a wavelength of 940 nm.

FIG. 7A is a view for explaining designated information stored in a memory of the electronic device according to various embodiments.

MODE FOR CARRYING OUT THE INVENTION

Figure 1:
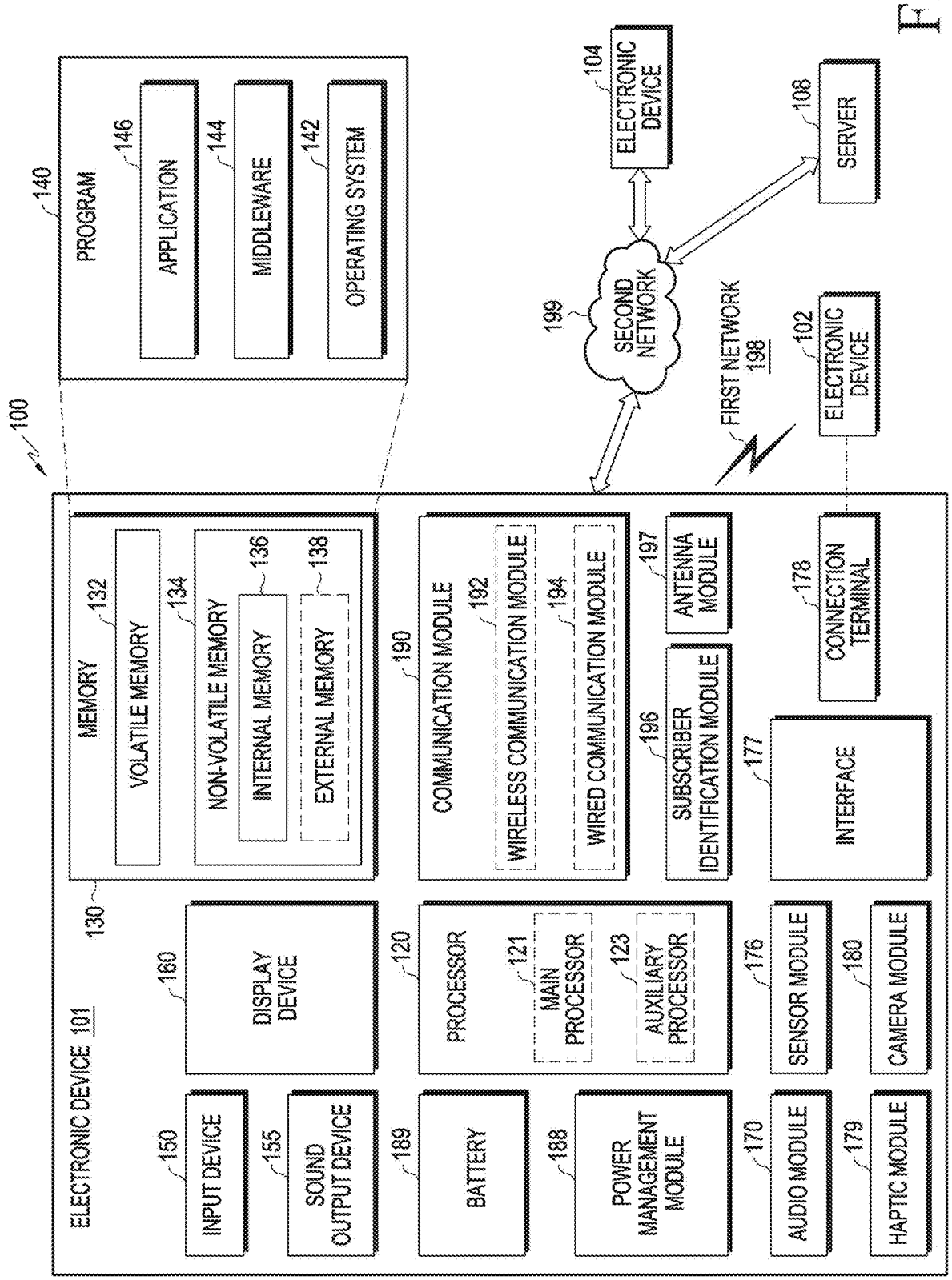
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input apparatus 150, a sound output apparatus 155, a display apparatus 160, an audio module 170, a sensor module 176, an interface 177, a haptic module 179, a camera module 180, a power management module 188, a battery 189, a communication module 190, a Subscriber Identification Module (SIM) 196, or an antenna module 197. In some embodiments, at least one (e.g., the display apparatus 160 or the camera module 180) of the elements may be omitted from the electronic device 101, or one or more other elements may be added to the electronic device 101. In some embodiments, some of the elements may be implemented as single integrated circuitry. For example, the sensor module 176 (e.g., a fingerprint sensor, an iris sensor, or an illuminance sensor) may be implemented as embedded in the display apparatus 160 (e.g., a display).

The processor 120 may execute, for example, software (e.g., a program 140) to control at least one other element (e.g., a hardware or software element) of the electronic device 101 connected to the processor 120, and may perform various data processings or arithmetic operations. According to an embodiment, as at least part of the data processing or computation, the processor 120 may load a command or data received from another element (e.g., the sensor module 176 or the communication module 190) in volatile memory 132, process the command or the data stored in the volatile memory 132, and store resulting data in non-volatile memory 134. According to an embodiment, as at least some of the data processings or arithmetic operations, the processor 120 may load a command or data received from another element (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit or an application processor), and an auxiliary processor 123 (e.g., a graphics processing unit, an image signal processor, a sensor hub processor, or a communication processor) that is operable independently from, or in conjunction with, the main processor 121. Additionally or alternatively, the auxiliary processor 123 may be configured to consume less power than the main processor 121, or to be specific to a specified function. The auxiliary processor 123 may be implemented as separate from, or as a part of, the main processor 121.

The auxiliary processor 123 may control at least some of functions or states related to at least one element (e.g., the display apparatus 160, the sensor module 176, or the communication module 190) among the elements of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as a part of another element (e.g., the camera module 180 or the communication module 190) functionally related to the auxiliary processor 123.

The memory 130 may store various data used by at least one element (e.g., the processor 120 or the sensor module 176) of the electronic device 101. The various data may include, for example, software (e.g., the program 140) and input data or output data for a command related to the software. The memory 130 may include the volatile memory 132 or the non-volatile memory 134.

The program 140 may be stored in the memory 130 as software, and may include, for example, an Operating System (OS) 142, middleware 144, or an application 146.

The input apparatus 150 may receive a command or data to be used by another element (e.g., the processor 120) of the electronic device 101, from the outside (e.g., a user) of the electronic device 101. The input apparatus 150 may include, for example, a microphone, a mouse, a keyboard, or a pen input apparatus (e.g., a stylus pen).

The sound output apparatus 155 may output sound signals to the outside of the electronic device 101. The sound output apparatus 155 may include, for example, a speaker or a receiver. The speaker may be used for general purposes, such as multimedia reproduction or recording reproduction, and the receiver may be used for incoming calls. According to an embodiment, the receiver may be implemented as separate from, or as a part of, the speaker.

The display apparatus 160 may visually provide information to the outside (e.g., a user) of the electronic device 101. The display apparatus 160 may include, for example, a display, a hologram apparatus, a projector, and control circuitry configured to control a corresponding one of the display, hologram apparatus, and projector. According to an embodiment, the display apparatus 160 may include touch circuitry configured to detect a touch, or sensor circuitry (e.g., a pressure sensor) configured to measure the strength of force generated by the touch.

The audio module 170 may convert a sound into an electrical signal or vice versa. According to an embodiment, the audio module 170 may obtain the sound via the input apparatus 150, or output the sound via the sound output apparatus 155 or an external electronic device (e.g., an electronic device 102) (e.g., a speaker or headphones) directly or wirelessly connected to the electronic device 101.

The sensor module 176 may detect an operating state (e.g., power or temperature) of the electronic device 101 or an environmental state (e.g., a state of a user) external to the electronic device 101, and then generate an electrical signal or a data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be connected to the external electronic device (e.g., the electronic device 102) directly or wirelessly. According to an embodiment, the interface 177 may include, for example, a High Definition Multimedia Interface (HDMI), a Universal Serial Bus (USB) interface, a Secure Digital (SD) card interface, or an audio interface.

A connecting terminal 178 may include a connector via which the electronic device 101 may be physically connected to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which can be recognized by a user via his or her tactile sensation or kinesthetic sensation. According to an embodiment, the haptic module 179 may include, for example, a motor, a piezoelectric element, or an electrical stimulator.

The camera module 180 may capture a still image or a moving image. According to an embodiment, the camera module 180 may include one or more lenses, image sensors, image signal processors, or flashes.

The power management module 188 may manage power supplied to the electronic device 101. According to an embodiment, the power management module 188 may be implemented as at least a part of, for example, a Power Management Integrated Circuit (PMIC).

The battery 189 may supply power to at least one element of the electronic device 101. According to an embodiment, the battery 189 may include, for example, a primary cell which is not rechargeable, a secondary cell which is rechargeable, or a fuel cell.

The communication module 190 may support: establishing a direct (e.g., wired) communication channel or a wireless communication channel between the electronic device 101 and the external electronic device (e.g., the electronic device 102, the electronic device 104, or the server 108); and performing communication via the established communication channel. The communication module 190 may include one or more communication processors that are operable independently from the processor 120 (e.g., the application processor (AP)) and support direct (e.g., wired) communication or wireless communication. According to an embodiment, the communication module 190 may include a wireless communication module 192 (e.g., a cellular communication module, a short-range wireless communication module, or a Global Navigation Satellite System (GNSS) communication module) or a wired communication module 194 (e.g., a Local Area Network (LAN) communication module or a Power Line Communication (PLC) module). A corresponding one of these communication modules may communicate with the external electronic device via the first network 198 (e.g., a short-range communication network, such as Bluetooth, Wi-Fi direct, or Infrared Data Association (IrDA)) or the second network 199 (e.g., a long-range communication network, such as a cellular network, the Internet, or a computer network (e.g., LAN or Wide Area Network (WAN)). These various types of communication modules may be implemented as a single element (e.g., a single chip), or may be implemented as multiple elements (e.g., multiple chips) separate from each other. The wireless communication module 192 may identify and authenticate the electronic device 101 in a communication network, such as the first network 198 or the second network 199, by using subscriber information (e.g., an International Mobile Subscriber Identity (IMSI)) stored in the subscriber identification module 196.

The antenna module 197 may transmit or receive a signal or power to or from the outside (e.g., the external electronic device) of the electronic device 101. According to an embodiment, the antenna module 197 may include at least one antenna including a radiating element made of a conductive material or having a conductive pattern formed on a substrate (e.g., a PCB). According to an embodiment, the antenna module 197 may include a plurality of antennas. In this configuration, at least one antenna appropriate for a communication scheme used in a communication network, such as the first network 198 or the second network 199, may be selected, for example, by the communication module 190 from the plurality of antennas. The signal or the power may be transmitted or received between the communication module 190 and the external electronic device via the selected at least one antenna. According to some embodiments, a component (e.g., a Radio Frequency Integrated Circuit (RFIC)) other than the radiating element may be additionally configured as a part of the antenna module 197.

At least some of the above-described elements may be connected to each other according to a communication scheme between neighboring apparatuses (e.g., a bus, General-Purpose Input and Output (GPIO), Serial Peripheral Interface (SPI), or Mobile Industry Processor Interface (MIPI)), and may exchange signals (e.g., commands or data) therebetween.

According to various embodiments of the disclosure, commands or data may be transmitted or received between the electronic device 101 and the external electronic device 104 via the server 108 connected to the second network 199. Each of the electronic devices 102 and 104 may be of a type identical to, or different from, that of the electronic device 101. According to an embodiment, all or some of operations to be executed by the electronic device 101 may be executed by one or more of the external electronic devices 102, 104, and 108. For example, when the electronic device 101 should perform a certain function or a certain service automatically or in response to a request from a user or another device, the electronic device 101, instead of, or in addition to, execution of the function or the service by the electronic device 101, may request the one or more external electronic devices to perform at least a part of the function or the service. The one or more external electronic devices having received the request may execute at least a part of the requested function or service, or an additional function or service related to the request, and deliver a result of the execution to the electronic device 101. The electronic device 101 may provide the result without any change or after being further processed, as at least a part of a response to the request. To that end, use may be made of, for example, cloud computing technology, distributed computing technology, or client-server computing technology.

Figure 2:
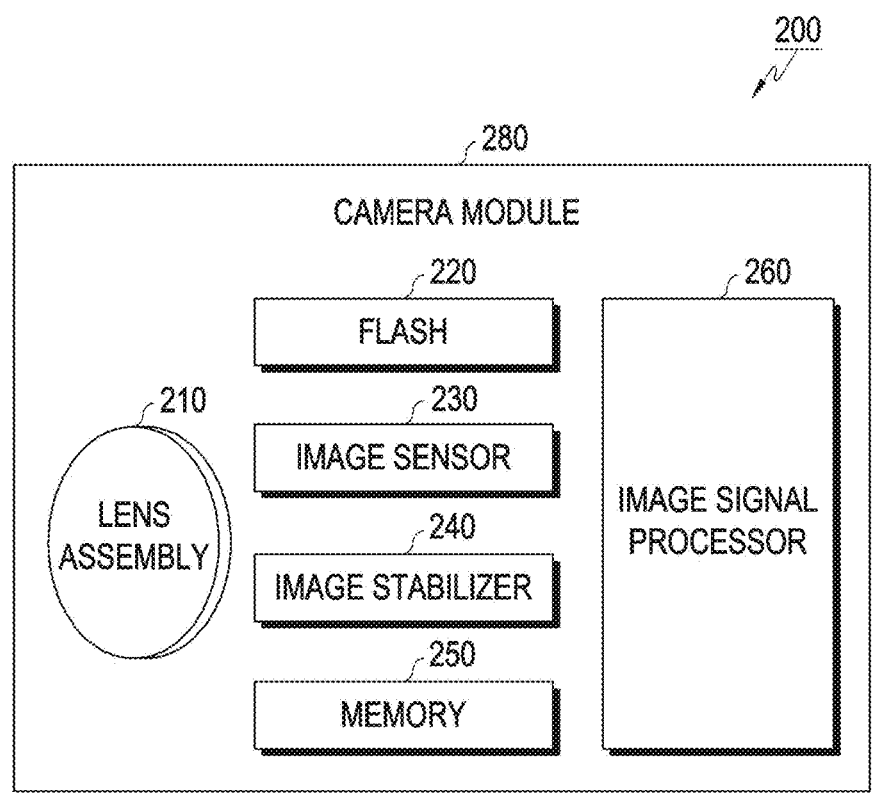
FIG. 2 is a block diagram illustrating a camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, a memory 250 (e.g., a buffer memory), or an image signal processor 260. The lens assembly 210 may collect light emitted or reflected from an object, an image of which is captured. The lens assembly 210 may include one or more lenses. According to an embodiment, the camera module 180 may include a plurality of lens assemblies 210. In this example, the camera module 180 may be, for example, a dual camera, a 360-degree camera, or a spherical camera. The plurality of lens assemblies 210 may all have the same lens attribute (e.g., view angle, focal length, auto-focus, f-number, or optical zoom), or at least one lens assembly may have at least one lens attribute different from that of another lens assembly. The lens assembly 210 may include, for example, a wide-angle lens or a telephoto lens. The flash 220 may emit a light source used to reinforce light emitted from an object. The flash 220 may include one or more Light-Emitting Diodes (LEDs) (e.g., a Red-Green-Blue (RGB) LED, a white LED, an IR LED, or an Ultraviolet (UV) LED) or a xenon lamp.

The image sensor 230 may acquire an image corresponding to an object by converting light, transmitted from the object via the lens assembly 210, into an electrical signal. According to an embodiment, the image sensor 230 may include: one image sensor selected from image sensors having different attributes, such as a RGB sensor, a Black-and-White (BW) sensor, an IR sensor, or a UV sensor; a plurality of image sensors having the same attribute; or a plurality of image sensors having different attributes. Each image sensor included in the image sensor 230 may be implemented by, for example, a Charged-Coupled Device (CCD) sensor or a Complementary Metal-Oxide-Semiconductor (CMOS) sensor.

In response to movement of the camera module 180 or the electronic device 101 including the camera module 180, the image stabilizer 240 may move the image sensor 230 or at least one lens included in the lens assembly 210 in a particular direction, or may control the same (e.g., adjust the read-out timing), in order to at least partially compensate for a negative effect (e.g., image blurring) due to the movement on an image being captured. According to an embodiment, the image stabilizer 240 may be implemented by, for example, an optical image stabilizer, and may detect the movement by using a gyro sensor (not illustrated) or an acceleration sensor (not illustrated) disposed inside or outside the camera module 180.

The memory 250 may store, at least temporarily, at least a part of an image acquired via the image sensor 230 for a subsequent image processing task. For example, when image acquisition is delayed due to shutter lag or multiple images are acquired at high speed, the acquired original image (e.g., a high-resolution image) may be stored in the memory 250, and its corresponding copy image (e.g., a low-resolution image) may be previewed on the display apparatus 160. Thereafter, if a specified condition is satisfied (e.g., by a user input or system command), at least a part of the original image stored in the memory 250 may be acquired and processed by, for example, the image signal processor 260. According to an embodiment, the memory 250 may be configured as at least a part of the memory 130 or as a separate memory that is operated independently of the memory 130.

The image signal processor 260 may perform image processing of an image acquired via the image sensor 230 or an image stored in the memory 250, wherein the image processing may be, for example, depth map generation, three-dimensional (3D) modeling, panorama generation, feature point extraction, image synthesis, or image compensation (e.g., noise reduction, resolution adjustment, luminance adjustment, blurring, sharpening, or softening). Additionally or alternatively, the image signal processor 260 may perform control (e.g., exposure time control or read-out timing control) over at least one (e.g., the image sensor 230) of the elements included in the camera module 180. An image processed by the image signal processor 260 may be stored back in the memory 250 for further processing, or may be delivered to an element (e.g., the memory 130, the display apparatus 160, the electronic device 102, the electronic device 104, or the server 108) external to the camera module 180. According to an embodiment, the image signal processor 260 may be configured as at least a part of the processor 120, or as a separate processor that is operated independently of the processor 120. When the image signal processor 260 is configured as a separate processor from the processor 120, images processed by the image signal processor 260 may be displayed on the display apparatus 160 by the processor 120 without any change or after being further image-processed.

According to an embodiment, the electronic device 101 may include at least two camera modules 180 having different attributes or functions. In an example of this configuration, at least one camera module 180 may be a wide-angle camera or a front camera, and at least another camera module may be a telephoto camera or a rear camera.

In the disclosure, a case in which a 3D image of a particular object is acquired using a 940 nm IR camera based on the structured light scheme will be disclosed by way of example. In this regard, according to various embodiments of the disclosure, when the intensity of external light is relatively low, for example, the intensity of the external light is in a range of 2 Klux to 6 Klux, various an operation/operations and a function/functions of the disclosure may be identically applied even to a case in which an 850 nm IR camera is used.

Figure 3A:
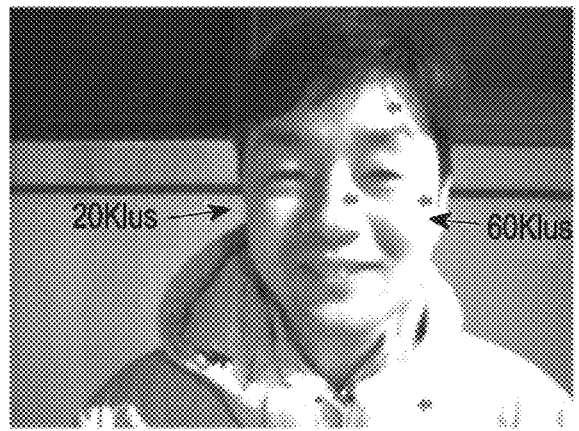
FIG. 3A and FIG. 3B are views for explaining a three-dimensional image acquired by an infrared camera having a wavelength of 850 nm.
Figure 3B:
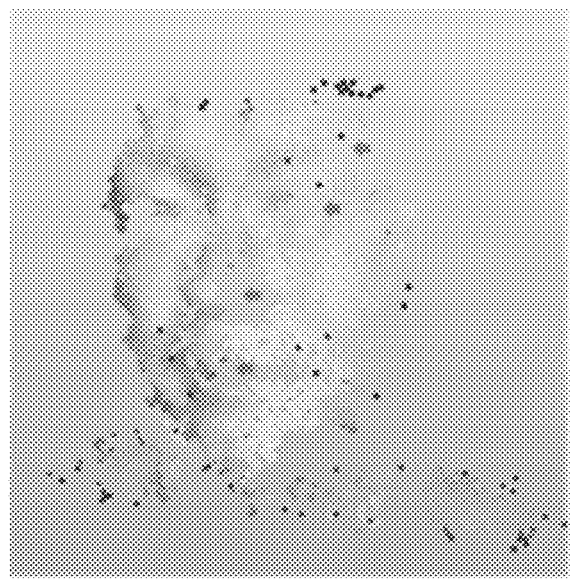

FIG. 3A and FIG. 3B are views for explaining a 3D image acquired by an IR camera having a wavelength of 850 nm.

FIG. 3B illustrates an example of a 3D image acquired with an exposure time of 0.5 msec from an object (e.g., a human face) illustrated in FIG. 3A by an IR camera having a wavelength of 850 nm.

Referring to FIG. 3B, when the object is captured by the 850 nm IR camera, a part around the nose is already saturated, and thus it may no longer be easy to distinguish the part around the nose from another part even when an IR pattern is projected.

Figure 3C:
FIG. 3C and FIG. 3D are views for explaining a three-dimensional image acquired by an infrared camera having a wavelength of 940 nm.
Figure 3D:
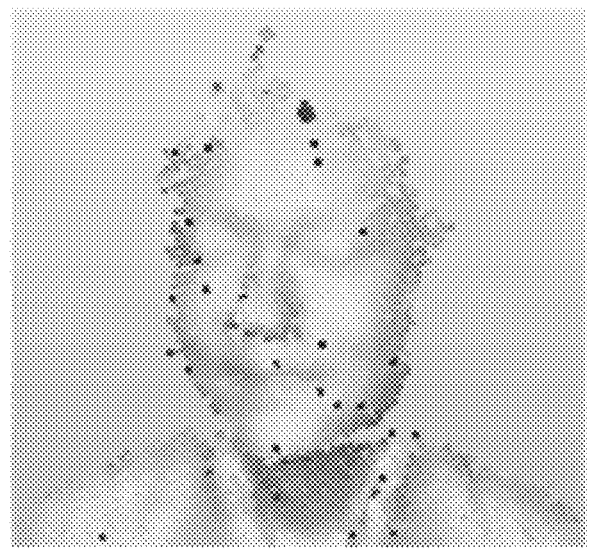

FIG. 3C and FIG. 3D are views for explaining a three-dimensional image acquired by an IR camera having a wavelength of 940 nm.

Referring to FIG. 3D, a 3D image acquired with an exposure time of 0.5 msec from an object (e.g., the same human face as in FIG. 3A) illustrated in FIG. 3C by a 940 nm IR camera may have a margin (i.e., a value obtained by subtracting a present value from a maximum value which can be detected by an image sensor) of higher grey values (in other words, grey levels) than those of the 3D image acquired by the 840 nm IR camera.

FIG. 4 is a view illustrating a comparison of attributes between an IR camera having a wavelength of 850 nm and an IR camera having a wavelength of 940 nm.

Referring to FIG. 4, when an 850 nm IR camera has a Relative Sensitivity (RS) of 1, a 940 nm IR camera may have an RS of 0.75. Due to the difference of RSs therebetween, a 3D image acquired by the 940 nm IR camera may have a sufficient grey margin compared to a 3D image acquired by the 850 nm IR camera.

Figure 5A:
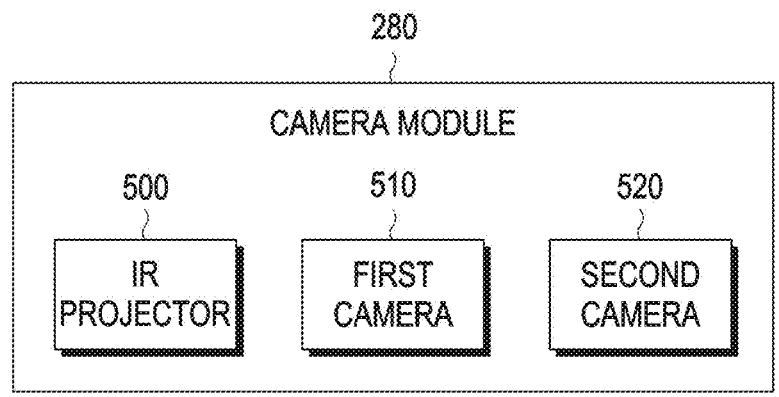
FIG. 5A is a block diagram illustrating a camera module according to various embodiments.

FIG. 5A is a block diagram illustrating a camera module 280 according to various embodiments.

Referring to FIG. 5A, the camera module 280 according to various embodiments of the disclosure may include an IR projector 500, a first camera 510, and a second camera 520.

The IR projector 500 may irradiate the object with light (e.g., IR light) for acquisition of a 3D image of the object. The IR projector 500 may include a Vertical Cavity Surface Emitting Laser (VCSEL) array light source having uniform light distribution, a black-and-white optical mask having a particular pattern, and a projection lens configured to project the IR light onto a space so that the IR light can have a particular angle of view. According to various embodiments of the disclosure, light output by the IR projector 500 may include light having a wavelength of 940 nm, but this configuration is only an example. According to various embodiments of the disclosure, various light sources, such as an edge emitting laser diode, as well as the VCSEL array light source may be applied.

The first camera 510 may include at least some of a lens assembly (e.g., the lens assembly 210), a flash (e.g., the flash 220), an image sensor (e.g., the image sensor 230), an image stabilizer (e.g., the image stabilizer 240), and an image signal processor (e.g., the image signal processor 260).

The second camera 520 may include an IR camera. The second camera may include a lens assembly (e.g., the lens assembly 210), an image sensor (e.g., the image sensor 230), and a bandpass filter configured to allow a light ray in a particular wavelength band among light rays incident on the camera module 280 (e.g., reflected IR light that, when IR light output from the IR projector 500 is reflected from the object, is incident on the second camera 520) to pass therethrough.

According to at least some elements constituting the camera module 280 according to various embodiments of the disclosure, a 3D image of the object may be acquired.

Figure 5B:
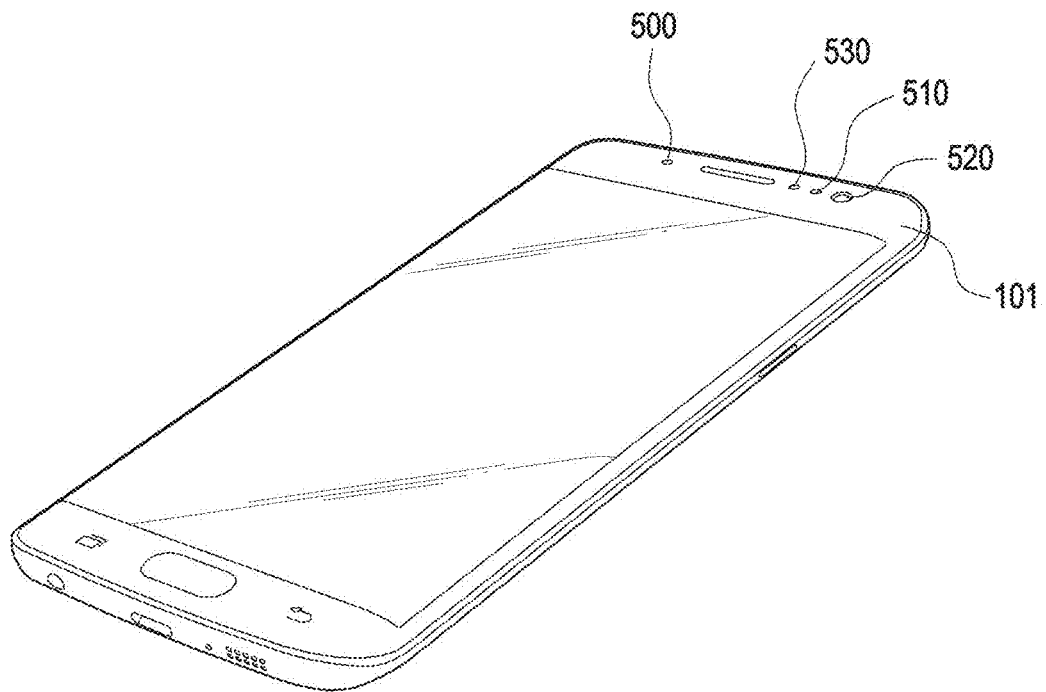
FIG. 5B is a view for explaining an electronic device according to various embodiments.

FIG. 5B is a view for explaining an electronic device 101 according to various embodiments.

The IR projector 500, the first camera 510, and the second camera 520, which are disclosed by way of example in FIG. 5A, may be provided in the electronic device 101 as illustrated by way of example in FIG. 5B. The electronic device 101 may include a sensor module 530, and the sensor module 530 may include an illuminance sensor configured to detect the intensity of external light. Examples of the external light may include sunlight when the electronic device 101 is located outdoors, and may include light output from an indoor electric lamp when the electronic device 101 is located indoors.

Figure 6A:
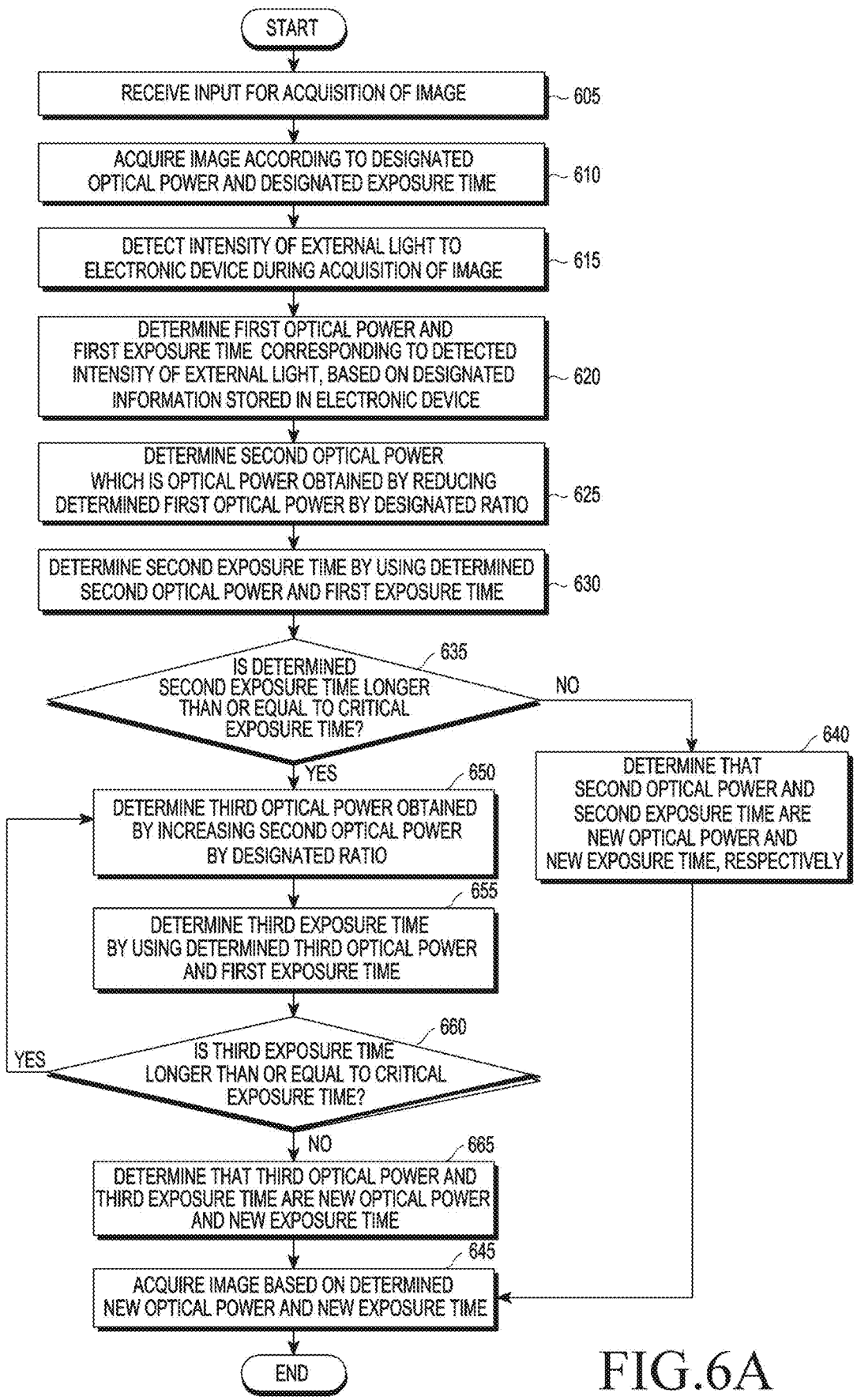
FIG. 6A, FIG. 6B, and FIG. 6C are flowcharts for explaining a control method of an electronic device according to various embodiments.
Figure 6B:
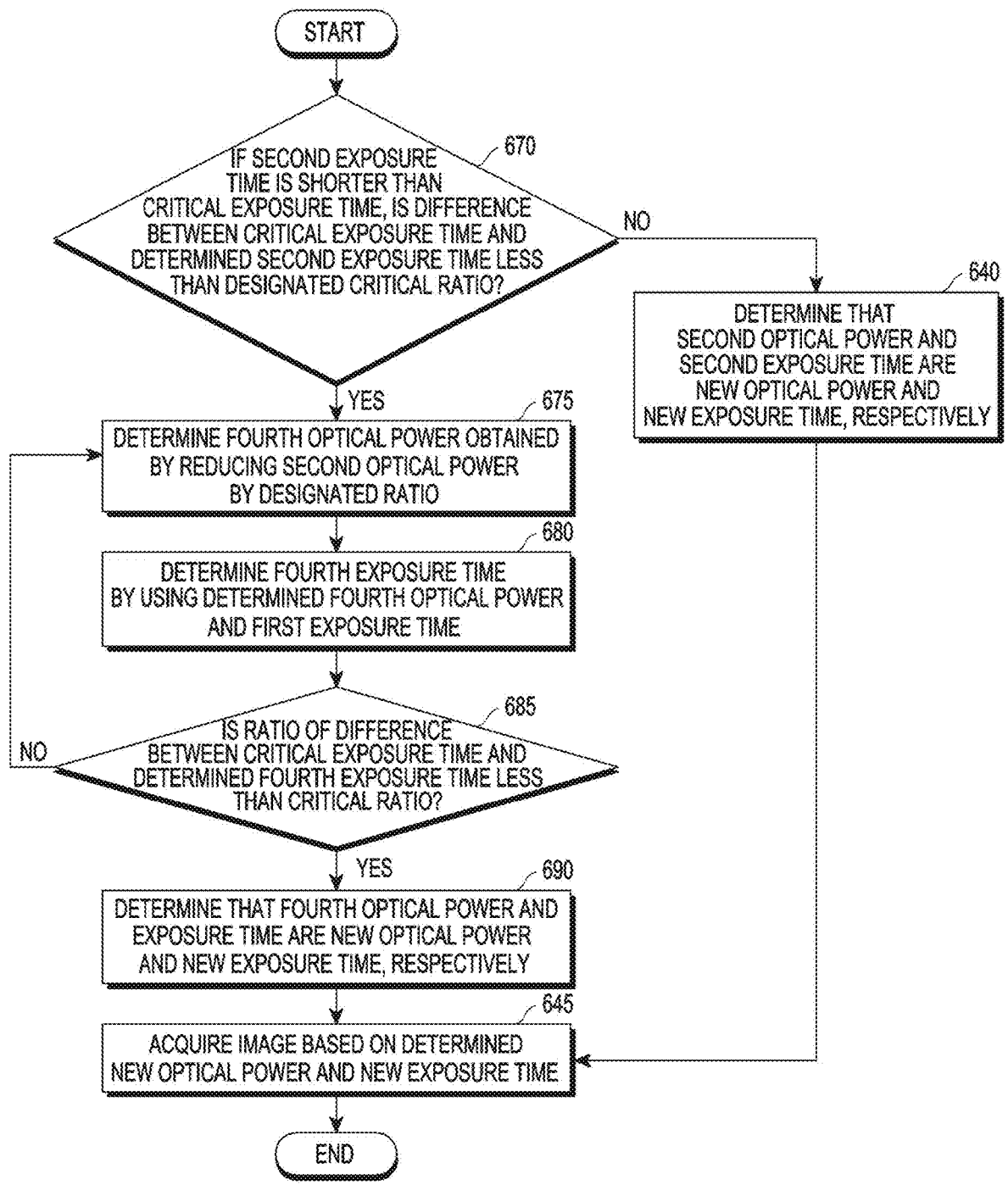
Figure 6C:
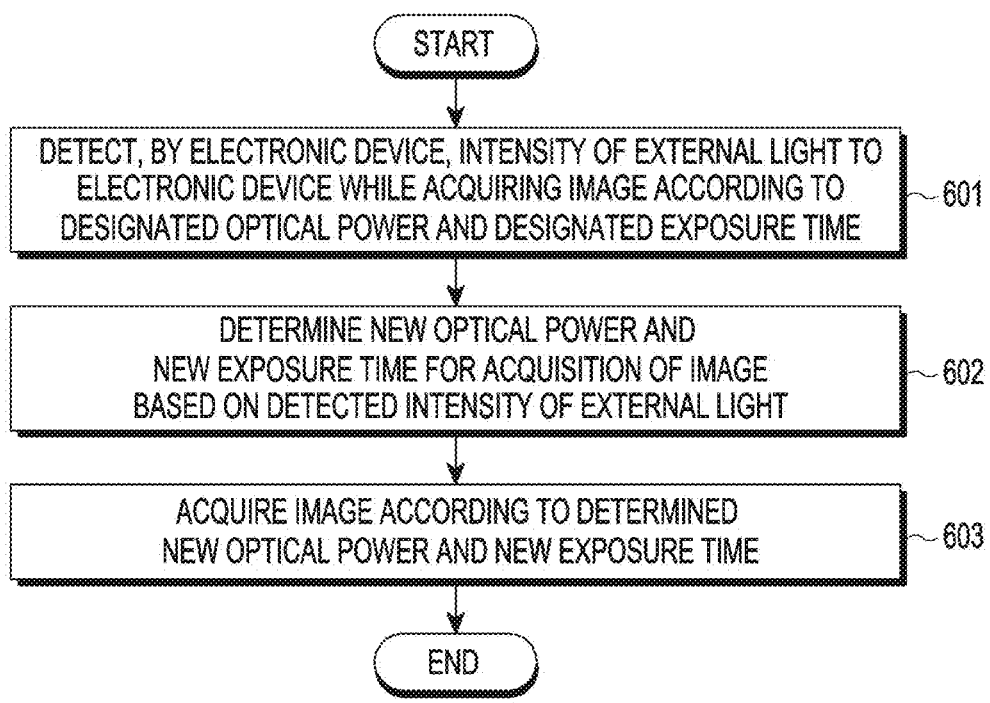

FIG. 6A, FIG. 6B, and FIG. 6C are flowcharts for explaining a method for controlling an electronic device according to various embodiments of the disclosure.

Referring to FIG. 6A, according to various embodiments of the disclosure, in operation 605, the electronic device 101

(e.g., the input apparatus 150 or the display apparatus 160) may receive an input for acquisition of an image of an object. The operation of receiving an input for acquisition of an image of the object may include, for example, an operation of receiving, from a user, an input for execution of a camera application.

According to various embodiments of the disclosure, in operation 610, the electronic device 101 (e.g., the camera module 180) may acquire an image of the object according to designated optical power and a designated exposure time. According to various embodiments of the disclosure, operation 610 may be controlled by the processor 120 of the electronic device 101. According to various embodiments of the disclosure, operation 645 may also be controlled by a processor separately provided in the camera module 180.

In operation 610, the designated optical power and the designated exposure time may include, for example, an optical power value and an exposure time value configured as default values (in other words, "predesignated") in order to acquire a 3D image of the object. The designated optical power and the designated exposure time may be configured as, for example, 3 watts (W) and 0.5 msec, respectively, but this configuration is only an example for description of the disclosure. The designated optical power and the designated exposure time may be configured to have various values by a manufacturer of the electronic device 101 or the user thereof.

According to various embodiments of the disclosure, in operation 615, the electronic device 101 (e.g., the sensor module 176) may detect an intensity of external light to the electronic device 101 during acquisition of an image of the object. In the disclosure, the term "external light" may be replaced by, and/or be used interchangeably with, the term "ambient light". According to various embodiments of the disclosure, operation 615 of detecting an intensity of external light may be performed simultaneously with operation 610 of acquiring an image of the object, according to the designated optical power and the designated exposure time.

Figure 7B:
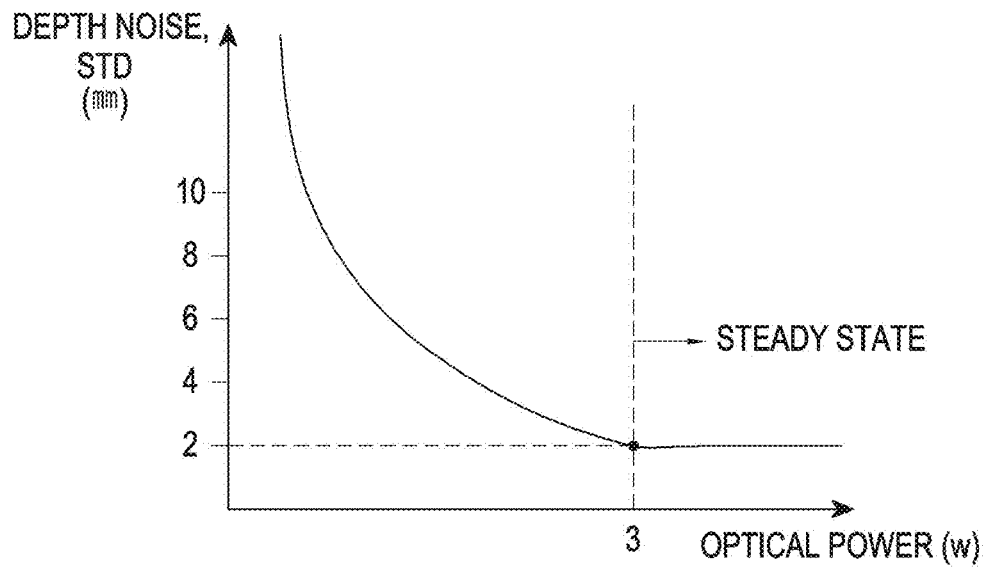
FIG. 7B and FIG. 7C are views for explaining optical power and an exposure time at a time point of entry to a steady state according to various embodiments.
Figure 7C:
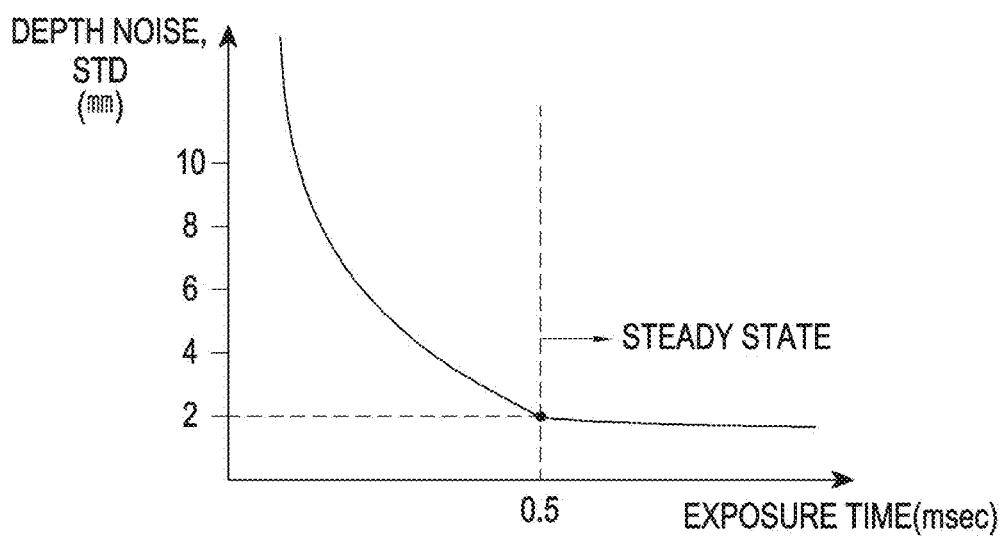

According to various embodiments of the disclosure, in operation 620, the electronic device 101 (e.g., the processor 120) may determine first optical power and a first exposure time corresponding to the detected intensity of the external light, based on designated information stored in the electronic device 101. According to various embodiments of the disclosure, when a 3D image of the object is acquired out-of-doors by the electronic device 101, light having a high illuminance intensity, such as sunlight, may act as noise (which may be referred to as the term "depth noise" in the disclosure). In order to minimize the depth noise, optical power and an exposure time at a time point at which the depth noise enters a steady state according to the illuminance of external light may be stored in the electronic device 101. The designated information may be stored in the electronic device 101, for example, in the form of a look-up table, as illustrated in FIG. 7A. The designated information may include: information on an intensity of external light detected by the sensor module 176 in a place where the electronic device 101 is currently located; information on a critical exposure time which is a maximum exposure time for which a 3D image of the object can be acquired without being saturated; information on optical power at a time point at which depth noise of the 3D image enters a steady state in response to the intensity of the external light; and information on an exposure time at the time point at which the depth noise of the 3D image enters the steady state in response to the intensity of the external light. Optical power and an exposure time at the time point of entry to the steady state may be determined, for example, as illustrated in FIG. 7B and FIG. 7C. According to various embodiments of the disclosure, the various pieces of information included in the designated information may be actually measured and may be stored in the electronic device in the process of manufacturing the electronic device 101 (which includes a time point after the electronic device is manufactured).

According to various embodiments of the disclosure, when the term "critical exposure time" is mentioned, the term "critical exposure time" may be replaced by, and/or be used interchangeably with, the term "saturation time". The critical exposure time may refer to an exposure time of an image sensor in a case where: an image of a particular object (e.g., a white-and-black object such as a checkerboard) is measured while changing the exposure time; and a region of the image sensor corresponding to a white region of the object outputs a maximum grey value, which can be output by the image sensor, according to the change in the exposure time.

The term "when the depth noise enters a steady state" may refer to a case in which, in an environment where particular external light acts as noise, the degree of the depth noise (or a Standard Deviation (STD) of the depth noise) is not changed or is changed within a designated error range so that this state may be recognized as if no change had occurred. FIG. 7B and FIG. 7C illustrate an example of optical power and an exposure time at a time point of entry to a steady state in an environment where the intensity of external light is, for example, 60 Klux. As illustrated in FIG. 7B and FIG. 7C, optical power may be 3 W and an exposure time may be 0.5 msec at the time point of entry to the steady state in the environment where the intensity of external light is 60 Klux. The depth noise may refer to, for example, a STD in a case where: a flat screen is disposed in a mid-region of a particular distance (e.g., 1 m) between the object and the electronic device 101; multiple images are acquired according to conditions for optical power and an exposure time; and then depth information is extracted from the acquired multiple images and the STD of the extracted depth values (Z values) is calculated. The depth information may be extracted in the form of a point cloud or a depth map. The depth noise may be associated with a ratio of an intensity of the external light to an intensity of IR light output from the IR projector 500, as in Mathematical Expression 1 below. In Mathematical Expression 1 below, $\sigma_z$ may represent depth noise, A may represent an intensity of external light, and L may represent an intensity of IR light output from the IR projector 500.

$$\sigma_Z \propto \alpha \frac{\sqrt{A}}{L} \qquad \text{Mathematical Expression 1}$$

Further, an SNR of the 3D image according to various embodiments of the disclosure may be inversely proportional to a square root of an intensity of external light and may be proportional to an intensity of IR light output from the IR projector 500, as in Mathematical Expression 2 below.

$$SNR = \frac{L}{\sqrt{A}} \qquad \text{Mathematical Expression 2}$$

According to various embodiments of the disclosure, the first optical power may refer to optical power (e.g., 3 W) corresponding to the detected intensity (e.g., 60 Klux) of the external light among the multiple pieces of information on optical power which are stored to be included in the designated information. According to various embodiments of the disclosure, the first exposure time may refer to an exposure time (e.g., 0.5 msec) corresponding to the detected intensity (e.g., 60 Klux) of the external light among the multiple pieces of information on the exposure times which are stored to be included in the designated information.

In FIG. 7A, for description of the disclosure, cases in which intensities of external light are 5 Klux, 10 Klux, 20 Klux, 30 Klux, 40 Klux, 50 Klux, and 60 Klux have been set forth, but various embodiments of the disclosure are not limited thereto. The designated information may include: various intensities of external light; and critical exposure times, optical power, and exposure times corresponding to the various intensities of the external light, as well as the intensities of external light illustrated in FIG. 7A.

According to various embodiments of the disclosure, in operation 625, the electronic device 101 (e.g., the processor 120) may determine second optical power which is optical power obtained by reducing the determined first optical power by a designated ratio. In operation 625, the designated ratio may be, for example, 50%, but this configuration is only an example. According to operation 625, the second optical power may be determined as 1.5 W.

According to various embodiments of the disclosure, in operation 630, the electronic device 101 (e.g., the processor 120) may determine a second exposure time by using the determined second optical power and the first exposure time. The second exposure time may be determined (in other words, be calculated) by Mathematical Expression 3 below.

$$\frac{I'_L}{I_L} = \frac{1}{\sqrt{(\text{time}/\text{time}_0)}} \qquad \text{Mathematical Expression 3}$$

In Mathematical Expression 3, time may represent a second exposure time, $I'_L$ may represent the second optical power, $I_L$ may represent the first optical power, and $\text{time}_0$ may represent the first exposure time.

According to various embodiments of the disclosure, in operation 635, the electronic device 101 (e.g., the processor 120) may determine whether the determined second exposure time is longer than or equal to a critical exposure time. In operation 635, a determination may be made based on the designated information. For example, if the determined second exposure time is 3.0 msec, this satisfies a condition in which the determined second exposure time is longer than or equal to 3.0 msec which is a critical exposure time in a case where the external light has an intensity of 30 Klux, and thus the processor of the electronic device 101 may determine that the determined second exposure time is longer than or equal to the critical exposure time.

According to various embodiments of the disclosure, in operation 640, if the determined second exposure time is shorter than the critical exposure time, the electronic device 101 (e.g., the processor 120) may determine that the second optical power and the second exposure time are new optical power and a new exposure time, respectively. According to various embodiments of the disclosure, in operation 645, the electronic device 101 (e.g., the camera module 180) may acquire a 3D image of the object based on the determined new optical power and new exposure time. According to various embodiments of the disclosure, operation 645 may be controlled by the processor 120 of the electronic device 101. According to various embodiments of the disclosure, operation 645 may also be controlled by a processor separately provided in the camera module 180.

Figure 8A:
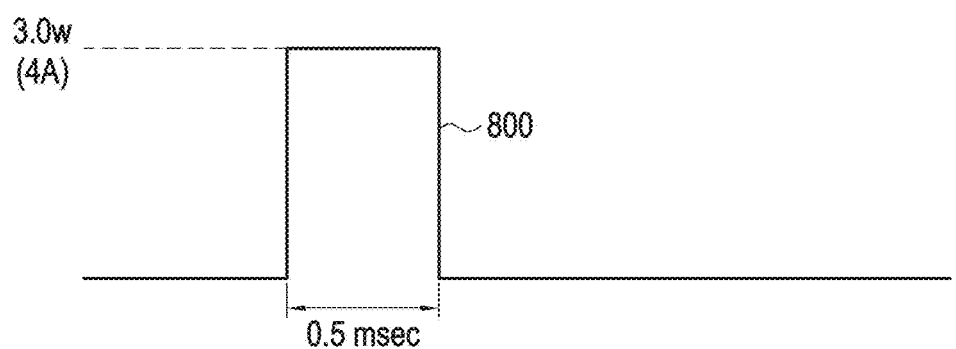
FIG. 8A and FIG. 8B are diagrams for explaining a current peak reduced according to adaptively-changed optical power and exposure time according to various embodiments.
Figure 8B:
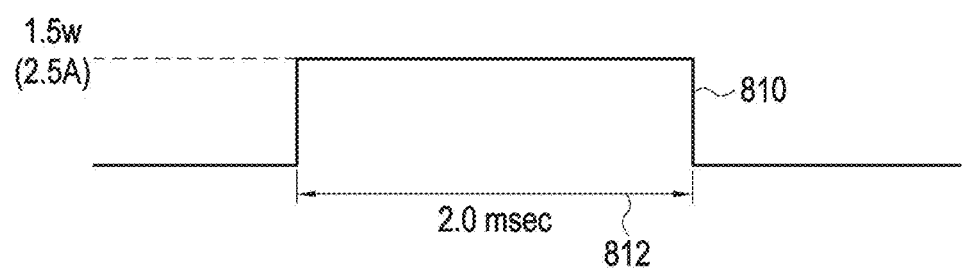

FIG. 8A and FIG. 8B are diagrams for explaining a current peak reduced according to adaptively-changed optical power and exposure time according to various embodiments. According to various embodiments of the disclosure, the new optical power and the new exposure time may be determined as 1.5 W and 2.0 msec, respectively, as illustrated in FIG. 8B in an environment where particular external light affects the electronic device 101. FIG. 8A illustrates a current pulse 800 in a case where a 3D image of the object is acquired according to the designated optical power (3 W) and the designated exposure time (0.5 msec) as described in operation 605. FIG. 8B illustrates a current pulse 810 in a case where a 3D image of the object is acquired according to newly-determined optical power (1.5 W) and a newly-determined exposure time (2 msec). As illustrated in FIG. 8B, a current peak value according to the new optical power and the new exposure time is 2.5 ampere (A), and when a 3D image of the object is acquired according to the new optical power and the new exposure time, the above-described current peak value may be reduced compared to 4 A which is a current peak value according to the designated optical power and the designated exposure time in operation 610. Referring to FIG. 8B, the new exposure time may be identical to a width 812 of the current pulse 810.

Since a voltage drop becomes smaller as a current peak value is reduced as described above, a particular application (e.g., a camera application) may be executed even at a low battery level (e.g., a battery level in a case where a state-of-charge of a battery is 15%), and accordingly, the reliability of a system can be improved. Even when a 3D image of the object is acquired according to the new optical power and the new exposure time, an SNR may be identical to that in the case where the 3D image is acquired based on optical power and an exposure time (i.e., 3 W and 0.5 msec) at a time point at which the depth noise enters a steady state. Accordingly, despite a reduction in a current peak, it is possible to acquire an image having the same quality as a 3D image acquired in the steady state.

According to various embodiments of the disclosure, in operation 650, if the determined second exposure time is longer than or equal to the critical exposure time, the electronic device 101 (e.g., the processor 120) may determine third optical power obtained by increasing the second optical power by a designated ratio (e.g., 10%). For example, when the determined second exposure time is 2.0 msec, 1.65 W obtained by increasing 1.5 W, which is the value of the second optical power, at 10% may be determined as third optical power.

According to various embodiments of the disclosure, in operation 655, the electronic device 101 (e.g., the processor 120) may determine a third exposure time by using the determined third optical power and the first exposure time. The third exposure time may refer to, that is, a second exposure time re-determined (in other words, re-calculated) by using Mathematical Expression 3. In Mathematical Expression 3, the value of the third optical power may be used, in place of the second optical power, to determine the third exposure time. In this example, in Mathematical Expression 3, time may represent the third exposure time.

According to various embodiments of the disclosure, in operation 650, the electronic device 101 (e.g., the processor 120) may determine whether the third exposure time is longer than or equal to the critical exposure time.

According to various embodiments of the disclosure, in operation 665, if the third exposure time is shorter than the critical exposure time, the electronic device 101 (e.g., the processor 120) may determine that the third optical power and the third exposure time are new optical power and a new exposure time, respectively. According to various embodiments of the disclosure, if the third exposure time is longer than or equal to the critical exposure time, the electronic device 101 (e.g., the processor 120) may repeatedly perform operations after operation 650.

According to various embodiments of the disclosure, in operation 670, if the second exposure time is shorter than the critical exposure time, the electronic device 101 (e.g., the processor 120) may determine whether a difference between the critical exposure time and the determined second exposure time is less than a designated critical ratio (e.g., 5%). FIG. 6B illustrates an embodiment which further includes operation 670 in addition to the embodiment described with reference to FIG. 6A. It is possible to make the second exposure time closer to the critical exposure time through an operation of determining whether a ratio of the difference between the critical exposure time and the determined second exposure time (e.g., ((critical exposure time-second exposure time)/critical exposure time)×100%) is less than the designated critical ratio, as in operation 670. As the second exposure time comes closer to the critical exposure time, an SNR of the 3D image may increase, and thus the quality of the 3D image can be further improved through the above-described operation.

According to various embodiments of the disclosure, in operation 645, if the difference between the critical exposure time and the determined second exposure time is less than the designated critical ratio, the electronic device 101 (e.g., the processor 120) may determine that the second optical power and the second exposure time are new optical power and a new exposure time, respectively. According to various embodiments of the disclosure, in operation 645, the electronic device 101 (e.g., the camera module 180) may acquire a 3D image of the object based on the determined new optical power and new exposure time.

According to various embodiments of the disclosure, in operation 675, if the difference between the critical exposure time and the determined second exposure time is greater than or equal to the designated critical ratio, the electronic device 101 (e.g., the processor 120) may determine fourth optical power obtained by reducing the second optical power by a designated ratio (e.g., 3%). Even when a 3D image of the object is acquired based on the second exposure time which has been determined to be shorter than the critical exposure time, the 3D image may not be saturated, but operation 675 may be performed in order to improve an SNR of the 3D image (i.e., in order to make the second exposure time closer to the critical exposure time).

According to various embodiments of the disclosure, in operation 680, the electronic device 101 (e.g., the processor 120) may determine a fourth exposure time by using the determined fourth optical power and the first exposure time. The fourth exposure time may be determined by Mathematical Expression 3. In Mathematical Expression 3, the value of the fourth optical power may be used, in place of the second optical power, to determine the fourth exposure time. In this example, in Mathematical Expression 3, time may represent the fourth exposure time.

According to various embodiments of the disclosure, in operation 685, the electronic device 101 (e.g., the processor 120) may determine whether a ratio of a difference between the critical exposure time and the determined fourth exposure time is less than the critical ratio.

According to various embodiments of the disclosure, in operation 690, if the difference between the critical exposure time and the determined fourth exposure time is less than the designated critical ratio, the electronic device 101 (e.g., the processor 120) may determine that the fourth optical power and the fourth exposure time are new optical power and a new exposure time, respectively. According to various embodiments of the disclosure, the electronic device 101 (e.g., the camera module 180) may acquire a 3D image of the object based on the new optical power and the new exposure time determined in operation 690. According to various embodiments of the disclosure, operation 690 may be controlled by the processor 120 of the electronic device 101. According to various embodiments of the disclosure, operation 690 may also be controlled by a processor separately provided in the camera module 180.

According to various embodiments of the disclosure, if the third exposure time is longer than or equal to the critical exposure time, the electronic device 101 (e.g., the processor 120) may repetitively execute operations after operation 675 (including operation 675).

According to various embodiments of the disclosure, if, although operations after operation 675 are repetitively executed, an exposure time determined according to this repetition is shorter than the critical exposure time but is still greater than or equal to the critical ratio, in order to prevent continuous repetition, the electronic device 101 (e.g., the processor 120) may execute the operations after operation 675 by the specified number of times (e.g., five times). For example, if, although the electronic device 101 (e.g., the processor 120) repetitively executes, five times, the operations after operation 675, an exposure time determined according to the repetition is still greater than or equal to the critical ratio, the electronic device 101 (e.g., the processor 120) may determine that the present exposure time, that is, the exposure time determined according to five repetitions, is a new exposure time.

Referring to FIG. 6C, according to various embodiments of the disclosure, in operation 601, the electronic device 101 (e.g., the sensor module 176) may detect an intensity of external light to the electronic device while the electronic device 101 (e.g., the camera module 180) acquires an image according to the designated optical power and the designated exposure time.

According to various embodiments of the disclosure, in operation 602, the electronic device 101 (e.g., the processor 120) may determine new optical power and a new exposure time for acquisition of an image based on the detected intensity of the external light.

According to various embodiments of the disclosure, in operation 603, the electronic device 101 (e.g., the camera module 180) may acquire an image according to the determined new optical power and new exposure time. According to various embodiments of the disclosure, operation 603 may be controlled by the processor 120 of the electronic device 101. According to various embodiments of the disclosure, operation 603 may also be controlled by a processor separately provided in the camera module 180.

According to various embodiments of the disclosure, if the detected external light has an intensity less than a designated intensity (e.g., 5 Klux) or has an intensity exceeding a designated intensity (e.g., 60 Klux), the electronic device 101 (e.g., the processor 120) may control the electronic device 101 such that a control method of the electronic device is not performed.

FIG. 9A, FIG. 9B, FIG. 9C, and FIG. 9D are views for explaining an operation/function of turning on/off a control method of an electronic device in response to a user input according to various embodiments of the disclosure.

Figure 9A:
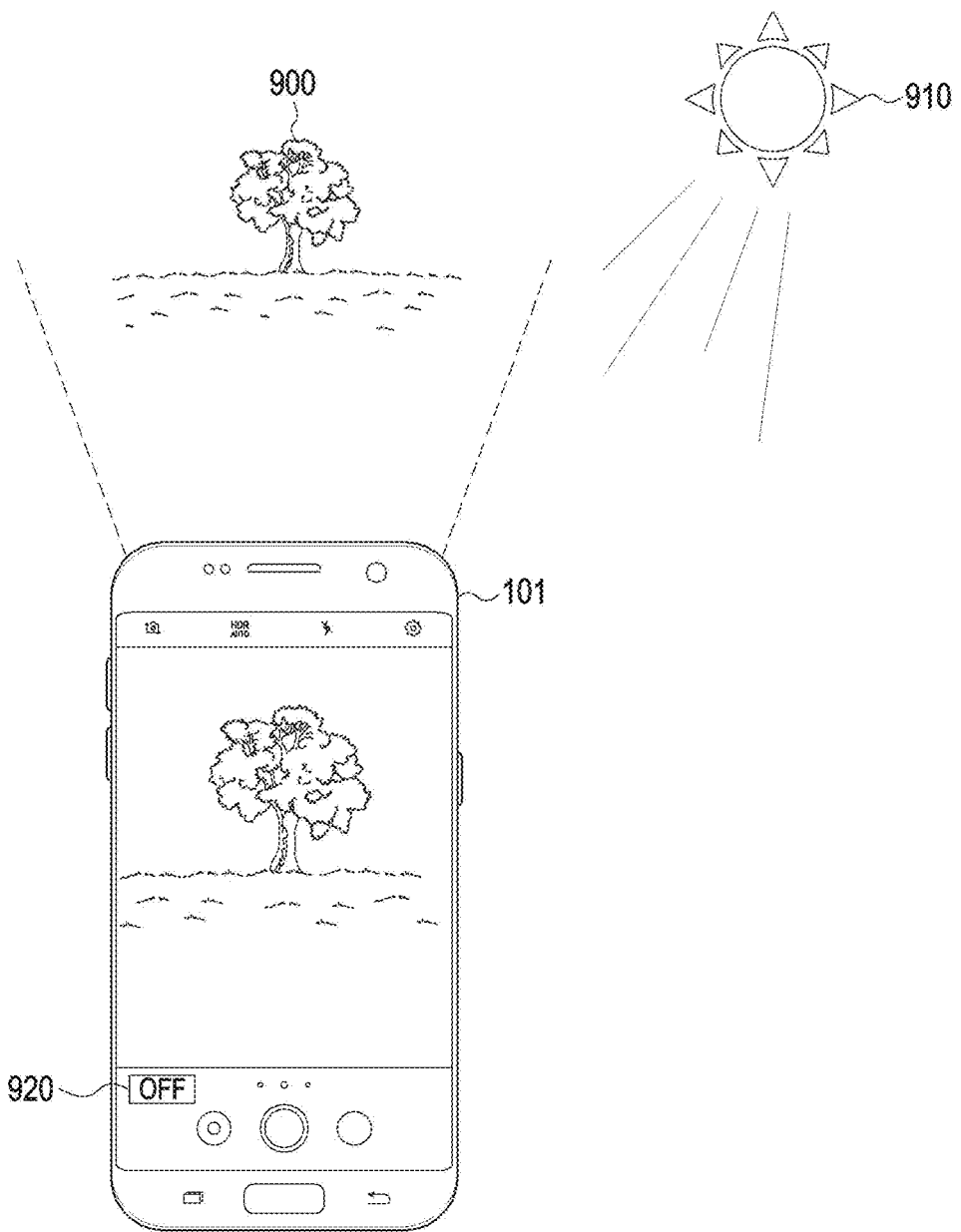
FIG. 9A, FIG. 9B, FIG. 9C, and FIG. 9D are views for explaining an operation/function of turning on/off a control method of an electronic device in response to a user input according to various embodiments.

According to various embodiments set forth in the disclosure, on/off control may be performed as illustrated in FIG. 9A, FIG. 9B, FIG. 9C, and FIG. 9D. Referring to FIG. 9A, in an environment where external light 970 exists, the electronic device 101 may acquire an image of an object 900 in order to acquire a 3D image of the object. As illustrated in FIG. 9A, the electronic device 101 may display a preview image on the electronic device 101. The electronic device 101 may display a user interface 920 configured to perform an operation/operations or a function/functions (for convenience of description, which will be referred to as an "adaptive control mode") according to various embodiments of the disclosure.

Figure 9B:
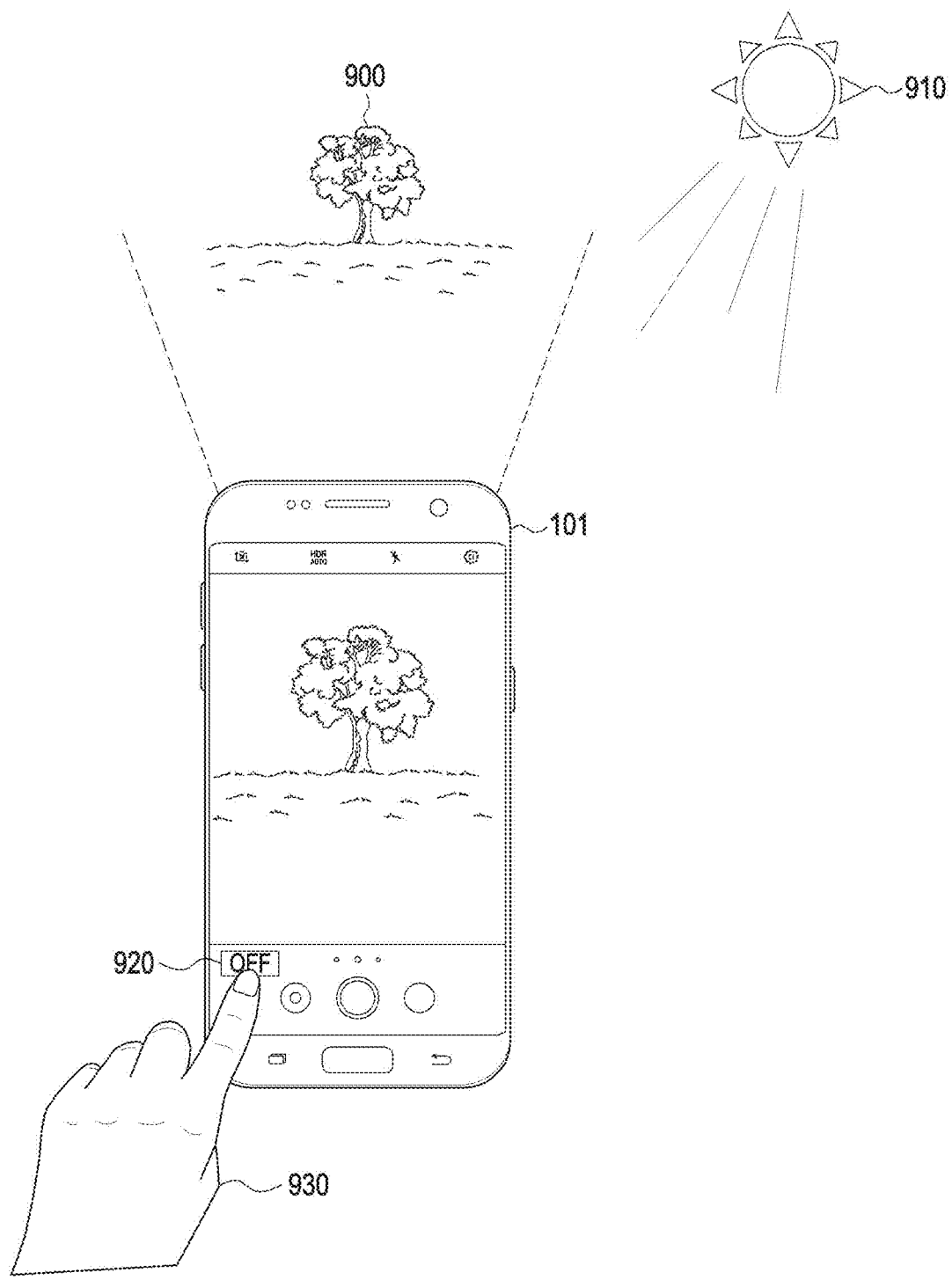

Referring to FIG. 9B, the electronic device 101 may receive, from a user 930, an input for execution of the adaptive control mode.

Figure 9C:
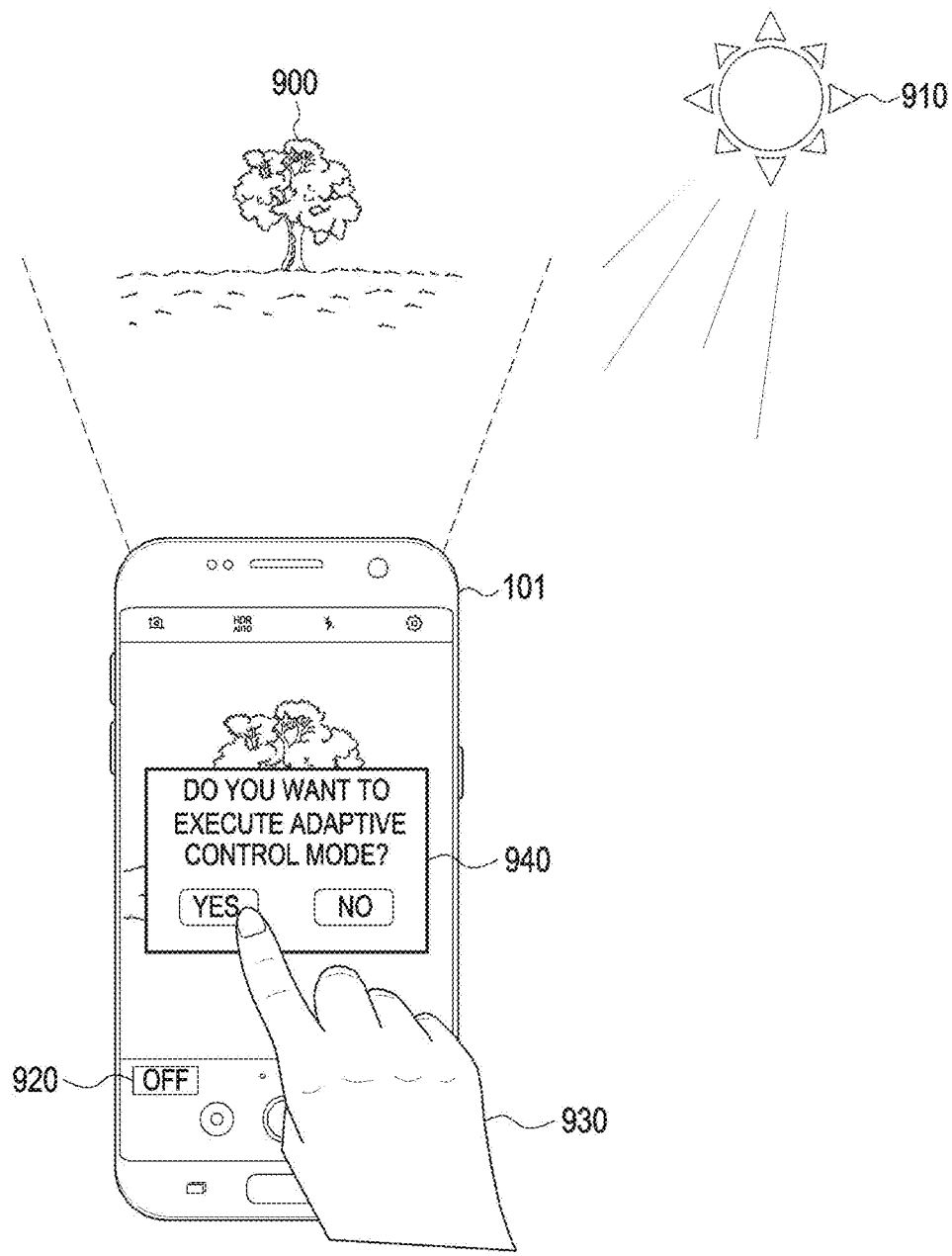

Referring to FIG. 9C, when receiving, from the user 930, an input for execution of the adaptive control mode, the electronic device 101 may display, on the electronic device 101, a screen 940 capable of receiving an input as to whether to execute the adaptive control mode. According to various embodiments of the disclosure, the electronic device 101 may receive an input, related to execution of the adaptive control mode, from the user 930 on the screen 940.

Figure 9D:
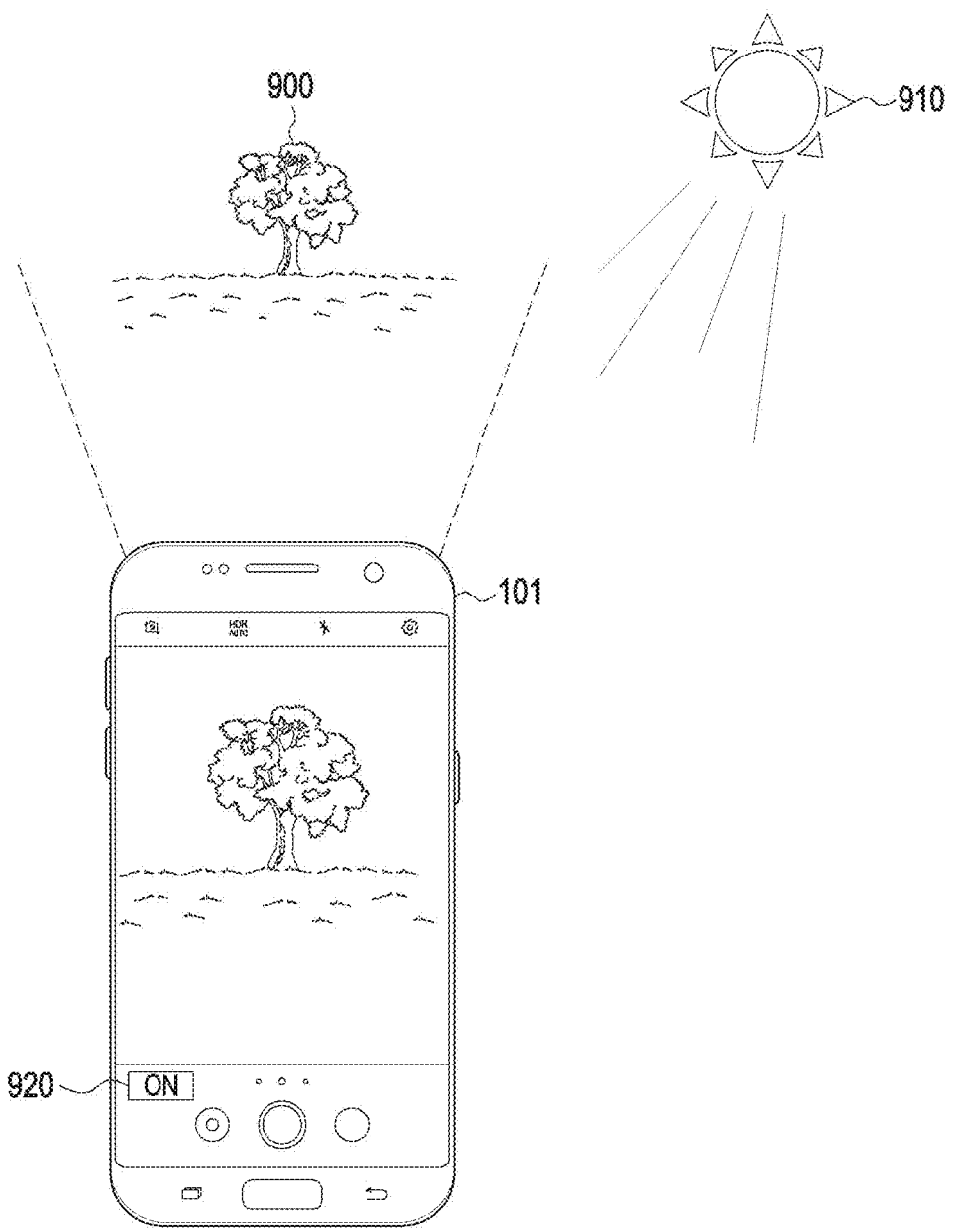

Referring to FIG. 9D, the electronic device 101 may: change contents, displayed on the user interface 920, to contents notifying that the adaptive control mode is being executed, according to the input from the user 930 as illustrated in FIG. 9C; and display the changed contents on the electronic device 101 as illustrated in FIG. 9D.

Figure 10:
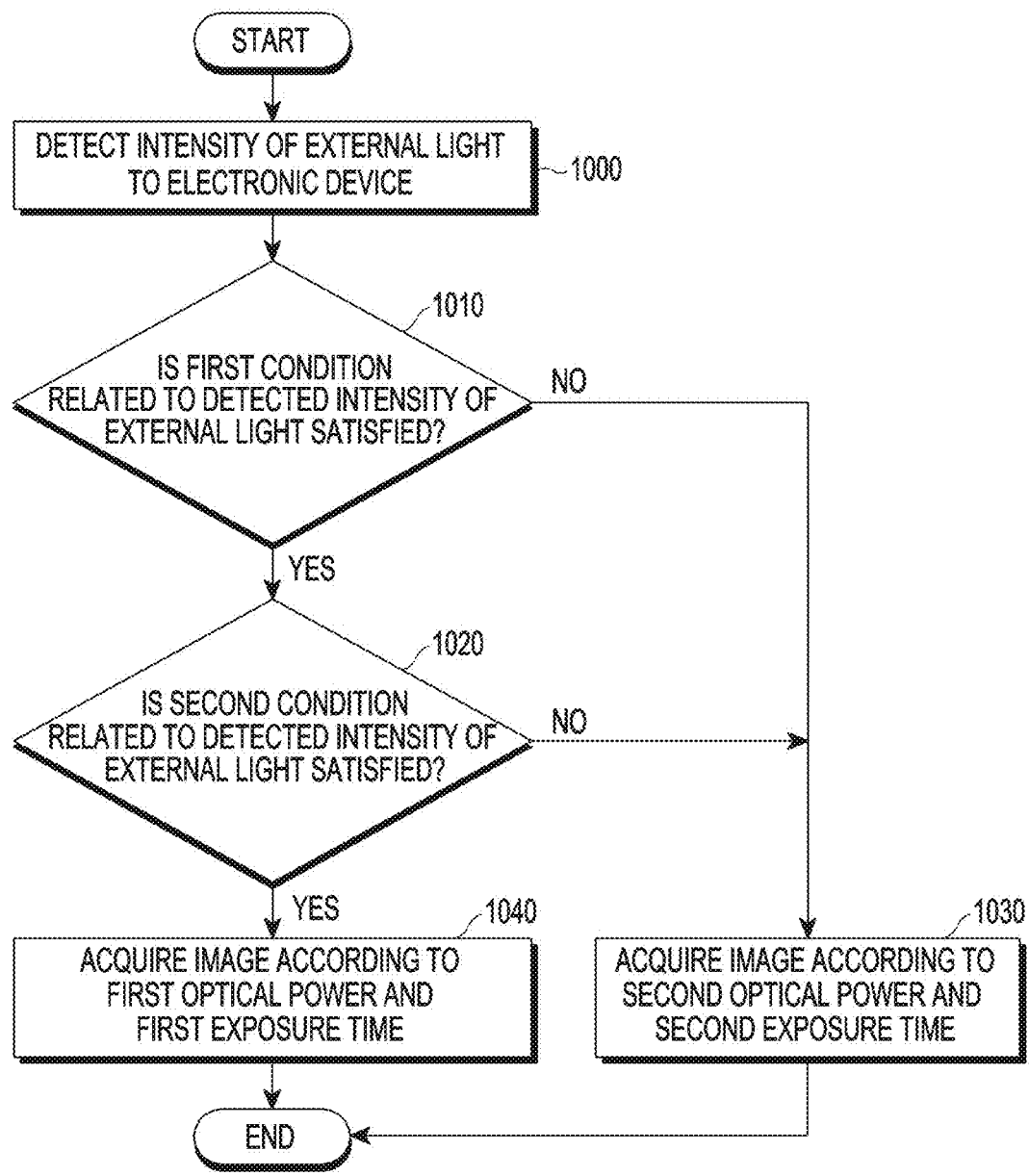
FIG. 10 is a flowchart for explaining a control method of an electronic device according to various embodiments.

FIG. 10 is a flowchart for explaining a control method of an electronic device according to various embodiments of the disclosure.

According to various embodiments of the disclosure, in operation 1000, the electronic device 101 (e.g., the sensor module 176) may detect an intensity of external light to the electronic device 101. According to various embodiments of the disclosure, operation 1000 may be controlled by the processor 120 of the electronic device 101.

According to various embodiments of the disclosure, in operation 1010, the electronic device 101 (e.g., the processor 120) may determine whether a first condition related to the detected intensity of the external light is satisfied.

According to various embodiments of the disclosure, in operation 1020, if the first condition is satisfied, the electronic device 101 (e.g., the processor 120) may determine whether a second condition related to the detected intensity of the external light is satisfied.

According to various embodiments of the disclosure, in operation 1030, if the second condition is satisfied, the electronic device 101 (e.g., the camera module 180) may acquire an image of an external object according to first optical power and a first exposure time. According to various embodiments of the disclosure, operation 1030 may be controlled by the processor 120 of the electronic device 101. According to various embodiments of the disclosure, operation 1030 may also be controlled by a processor separately provided in the camera module 180.

According to various embodiments of the disclosure, in operation 1040, if the first condition and/or the second condition is not satisfied, the electronic device 101 (e.g., the camera module 180) may acquire an image of the external object according to second optical power and a second exposure time. According to various embodiments of the disclosure, operation 1040 may be controlled by the processor 120 of the electronic device 101. According to various embodiments of the disclosure, operation 1040 may also be controlled by a processor separately provided in the camera module 180.

An electronic device according to various embodiments of the disclosure may include: a light output unit configured to be capable of outputting light in at least partial band of infrared light; a camera configured to be capable of detecting light in the at least partial band of the infrared light which has been output from the light output unit and is reflected from an external object; a sensor unit configured to be capable of detecting an intensity of external light to the electronic device; and a processor, wherein the processor is configured to: emit, to the external object, the light in the at least partial band of the infrared light by using the light output unit; as a part of an operation of emitting the light, determine the intensity of the external light by using the sensor unit, emit light in the at least partial band of the infrared light to the external object according to first optical power based on a first condition related to the intensity of the external light, and emit light in the at least partial band of the infrared light to the external object according to second optical power based on a second condition related to the intensity of the external light; receive, by using the camera, the light in the at least partial band of the infrared light which has been reflected from the external object; as a part of an operation of receiving the light, receive light in the at least partial band of the infrared light which has been reflected from the external object, according to a first exposure time based on the emitting of the light corresponding to the first optical power, and receive light in the at least partial band of the infrared light which has been reflected from the external object, according to a second exposure time based on the emitting of the light corresponding to the second optical power; and generate depth information corresponding to the external object based on a pattern of the received light in the at least partial band of the infrared light.

An electronic device according to various embodiments of the disclosure may include: a housing; a camera module, at least a part of which is exposed through the housing; a sensor module, at least a part of which is exposed through the housing; a processor configured to be disposed inside the housing and be operatively connected to the camera module and the sensor module; and at least one memory configured to be disposed inside the housing and be operatively connected to the processor, wherein the memory is configured to store instructions that, when executed, cause the processor to: while the camera module acquires an image according to designated optical power and a designated exposure time, detect an intensity of external light to the electronic device by using the sensor module; determine new optical power and a new exposure time for acquisition of the image based on the detected intensity of the external light; and acquire the image according to the determined new optical power and new exposure time.

In the electronic device according to various embodiments of the disclosure, designated information stored in the memory may include information on intensities of multiple external light rays; information on critical exposure times designated to correspond to the intensities of the multiple external light rays, respectively; information on optical power at a time point at which depth noise of an image enters a steady state, the optical power being designated to correspond to the intensities of the multiple external light rays, respectively; and information on exposure times at the time point at which the depth noise of the image enters the steady state, the exposure times being designated to correspond to the intensities of the multiple external light rays, respectively.

The electronic device according to various embodiments of the disclosure may be configured to, when an intensity of the external light is detected, further store, in the memory, an instruction for determining first optical power corresponding to the intensity of the external light among the pieces of information on optical power, and a first exposure time corresponding to the intensity of the external light among the pieces of information on the exposure times.

The electronic device according to various embodiments of the disclosure may be configured to further store, in the memory, an instruction for determining second optical power having a value obtained by reducing a value of the determined first optical power by a designated ratio.

The electronic device according to various embodiments of the disclosure may be configured to further store, in the memory, an instruction for determining whether the determined second exposure time is longer than or equal to a first critical exposure time which is a critical exposure time corresponding to the intensity of the external light among the critical exposure times.

The electronic device according to various embodiments of the disclosure may be configured to, when the second exposure time is longer than or equal to the first critical exposure time, further store, in the memory, an instruction for increasing the second optical power by a designated ratio, and an instruction for re-determining the second exposure time by using the increased second optical power.

The electronic device according to various embodiments of the disclosure may be configured to, when the second exposure time is shorter than the first critical exposure time, further store, in the memory, an instruction for determining that the second optical power and the second exposure time are the new optical power and the new exposure time, respectively.

The electronic device according to various embodiments of the disclosure may be configured to, when the second exposure time is shorter than the first critical exposure time, further store, in the memory, an instruction for determining whether a difference between the second exposure time and the first critical exposure time is less than or equal to a designated critical ratio, and an instruction for, when the difference between the second exposure time and the first critical exposure time is less than or equal to the designated critical ratio, determining that the second optical power and the second exposure time are the new optical power and the new exposure time, respectively.

The electronic device according to various embodiments of the disclosure may be configured to, when the second exposure time is shorter than the first critical exposure time, further store, in the memory, an instruction for determining whether a difference between the second exposure time and the first critical exposure time is less than or equal to a designated critical ratio; an instruction for, when the difference between the second exposure time and the first critical exposure time is greater than or equal to the designated critical ratio, re-increasing the increased second optical power by a designated ratio; and an instruction for determining the second exposure time by using the re-increased second optical power.

A recording medium according to various embodiments of the disclosure may store instructions configured to cause a processor to perform at least one operation including: while an electronic device acquires an image according to designated optical power and a designated exposure time, detecting an intensity of external light to the electronic device by an electronic device; determining new optical power and a new exposure time for acquisition of the image based on the detected intensity of the external light, by an electronic device; and acquiring the image according to the determined new optical power and new exposure time by an electronic device.

According to various embodiments of the disclosure, designated information for determining the first condition and the second condition may be stored in the electronic device, and the designated information may include: information on intensities of multiple external light rays; information on critical exposure times designated to correspond to the intensities of the multiple external light rays, respectively; information on optical power at a time point at which depth noise of an image enters a steady state, the optical power being designated to correspond to the intensities of the multiple external light rays, respectively; and information on exposure times at the time point at which the depth noise of the image enters the steady state, the exposure times being designated to correspond to the intensities of the multiple external light rays, respectively.

According to various embodiments of the disclosure, the first condition may include a condition as to whether the first exposure time determined based on the detected intensity of the external light is longer than or equal to a critical exposure time stored to be included in the designated information.

According to various embodiments of the disclosure, the processor may be further configured to, when the first exposure time is shorter than the critical exposure time stored to be included in the designated information, generate depth information corresponding to the external object according to the first optical power and the first exposure time.

According to various embodiments of the disclosure, the processor may be further configured to, when the first exposure time is longer than or equal to the critical exposure time stored to be included in the designated information, generate depth information corresponding to the external object according to the second optical power and the second exposure time.

According to various embodiments of the disclosure, each of the first optical power and the second optical power may include optical power having a value obtained by reducing optical power corresponding to the intensity of the external light by a designated ratio among the pieces of information on optical power.

According to various embodiments of the disclosure, the second condition may include a condition as to whether a critical ratio, which is a difference between the second exposure time determined based on the intensity of the external light and a critical exposure time stored to be included in the designated information, is less than a designated critical ratio.

According to various embodiments of the disclosure, the processor may be further configured to, when the critical ratio is less than the designated critical ratio, generate depth information corresponding to the external object according to the first optical power and the first exposure time.

According to various embodiments of the disclosure, the processor may be further configured to, when the critical ratio is greater than or equal to the designated critical ratio, generate depth information corresponding to the external object according to the second optical power and the second exposure time.

According to various embodiments of the disclosure, the processor may be further configured to, when the critical ratio is greater than or equal to the designated critical ratio, re-determine whether the second condition is satisfied, by using optical power having a value obtained by reducing optical power corresponding to the intensity of the external light by a designated ratio among pieces of information on optical power stored to be included in the designated information.

A computer-readable recording medium according to various embodiments of the disclosure may store at least one operation including: emitting, to an external object, light in at least partial band of infrared light; as a part of an operation of emitting the light, determining an intensity of external light, emitting light in the at least partial band of the infrared light to the external object according to first optical power based on a first condition related to the intensity of the external light, and emitting light in the at least partial band of the infrared light to the external object according to second optical power based on a second condition related to the intensity of the external light; receiving the light in the at least partial band of the infrared light which has been reflected from the external object; and as a part of an operation of receiving the light, receiving light in the at least partial band of the infrared light which has been reflected from the external object, according to a first exposure time based on the emitting of the light corresponding to the first optical power, and receiving light in the at least partial band of the infrared light which has been reflected from the external object, according to a second exposure time based on the emitting of the light corresponding to the second optical power.

Electronic devices according to various embodiments set forth in the disclosure may be of various types. The electronic devices may include, for example, portable communication devices (e.g., smart phones), computer devices, portable multimedia devices, portable medical devices, cameras, wearable devices, or home appliances. The electronic devices according to embodiments of the disclosure are not limited to the above-described devices.

It should be appreciated that various embodiments of the disclosure and the terms used therein are not intended to limit the technical features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the items, unless the relevant context clearly indicates otherwise. As used herein, each of such phrases as "A or B", "at least one of A and B", "at least one of A or B", "A, B, or C", "at least one of A, B, and C", and "at least one of A, B, or C", may include one or all possible combinations of the items enumerated together in a corresponding one of the phrases. As used herein, such terms as "1st" and "2nd", or "first" and "second" may be used to simply distinguish a corresponding element from another, and does not limit the elements in other aspects (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with said another element directly (e.g., wiredly), wirelessly, or via a third element.

As used herein, the term "module" may include a unit implemented in hardware, software, or firmware, and may be used interchangeably with other terms, for example, "logic", "logic block", "part", or "circuitry". A module may be a single integral element, or a minimum unit or part thereof, configured to perform one or more functions. For example, according to an embodiment, the module may be implemented in the form of an Application-Specific Integrated Circuit (ASIC).

Various embodiments of the disclosure may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke and execute at least one of the one or more instructions stored in the storage medium. This configuration allows the machine to be operated to perform at least one function according to the at least one invoked instruction. The one or more instructions may include a code generated by a complier or a code executable by an interpreter. The machine-readable storage medium may be provided in the form of a non-transitory storage medium. In this configuration, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be provided by being included in a computer program product. The computer program product may be traded as a product between a seller and a buyer. The computer program product may be distributed in the form of a machine-readable storage medium (e.g., a Compact Disc Read Only Memory (CD-ROM)), or be distributed (e.g., downloaded or uploaded) online via an application store (e.g., Play Store™), or between two user devices (e.g., smart phones) directly. In the case of online distribution, at least a part of the computer program product may be temporarily generated or at least temporarily stored in the machine-readable storage medium, such as a memory of a manufacturer's server, an application store's server, or a relay server.

According to various embodiments, each element (e.g., a module or a program) of the above-described elements may include a single entity or multiple entities. According to various embodiments, one or more elements or operations among the above-described corresponding elements may be omitted, or one or more other elements or operations may be added. Alternatively or additionally, multiple elements (e.g., modules or programs) may be integrated into a single element. In such a case, the integrated element may perform one or more functions of each of the multiple elements in the same or similar manner as they are performed by a corresponding one of the multiple elements before the integration. According to various embodiments, operations performed by a module, a program, or another element may be executed sequentially, in parallel, repeatedly, or heuristically; one or more of the operations may be executed in another order or omitted; or one or more other operations may be added.

The invention claimed is:

1. An electronic device comprising:
   a light output unit configured to be capable of outputting light in at least partial band of infrared light;
   a camera configured to be capable of detecting light in the at least partial band of the infrared light which has been output from the light output unit and is reflected from an external object;
   a sensor unit configured to be capable of detecting an intensity of external light to the electronic device; and
   a processor,
   wherein the processor is configured to:
      emit, to the external object, the light in the at least partial band of the infrared light by using the light output unit;
      as a part of an operation of emitting the light,
         determine the intensity of the external light by using the sensor unit,
         emit light in the at least partial band of the infrared light to the external object according to first optical power based on a first condition related to the intensity of the external light, and
         emit light in the at least partial band of the infrared light to the external object according to second optical power based on a second condition related to the intensity of the external light;
      receive, by using the camera, the light in the at least partial band of the infrared light which has been reflected from the external object;
      as a part of an operation of receiving the light,
         receive light in the at least partial band of the infrared light which has been reflected from the external object, according to a first exposure time based on the emitting of the light corresponding to the first optical power, and
         receive light in the at least partial band of the infrared light which has been reflected from the external object, according to a second exposure time based on the emitting of the light corresponding to the second optical power; and
      generate depth information corresponding to the external object based on a pattern of the received light in the at least partial band of the infrared light.

2. The electronic device of claim 1, wherein designated information for determining the first condition and the second condition is stored in the electronic device, and the designated information comprises:
   information on intensities of multiple external light rays;
   information on critical exposure times measured to correspond to the intensities of the multiple external light rays, respectively;
   information on optical power at a time point at which depth noise of an image enters a steady state, the optical power being measured to correspond to the intensities of the multiple external light rays, respectively; and
   information on exposure times at the time point at which the depth noise of the image enters the steady state, the exposure times being measured to correspond to the intensities of the multiple external light rays, respectively.

3. The electronic device of claim 2, wherein the first condition comprises a condition as to whether the first exposure time determined based on the detected intensity of the external light is longer than or equal to a critical exposure time stored to be included in the designated information.

4. The electronic device of claim 3, wherein the processor is further configured to, when the first exposure time is shorter than the critical exposure time stored to be included in the designated information, generate depth information corresponding to the external object according to the first optical power and the first exposure time.

5. The electronic device of claim 3, wherein the processor is further configured to, when the first exposure time is longer than or equal to the critical exposure time stored to be included in the designated information, generate depth information corresponding to the external object according to the second optical power and the second exposure time.

6. The electronic device of claim 1, wherein each of the first optical power and the second optical power comprises optical power having a value obtained by reducing optical power corresponding to the intensity of the external light by a designated ratio among pieces of information on -optical power.

7. The electronic device of claim 1, wherein the second condition comprises a condition as to whether a critical ratio, which is a difference between the second exposure time determined based on the intensity of the external light and a critical exposure time stored to be included in designated information, is less than a designated critical ratio.

8. The electronic device of claim 7, wherein the processor is further configured to, when the critical ratio is less than the designated critical ratio, generate depth information corresponding to the external object according to the first optical power and the first exposure time.

9. The electronic device of claim 7, wherein the processor is further configured to, when the critical ratio is greater than or equal to the designated critical ratio, generate depth information corresponding to the external object according to the second optical power and the second exposure time.

10. The electronic device of claim 7, wherein the processor is further configured to, when the critical ratio is greater than or equal to the designated critical ratio, re-determine whether the second condition is satisfied, by using optical power having a value obtained by reducing optical power corresponding to the intensity of the external light by a designated ratio among pieces of information on optical power stored to be included in the designated information.

11. A computer-readable recording medium storing instructions configured to cause a processor to perform at least one operation comprising:
   emitting, to an external object, light in at least partial band of infrared light;
   as a part of an operation of emitting the light,
      determining an intensity of external light,
      emitting light in the at least partial band of the infrared light to the external object according to first optical power based on a first condition related to the intensity of the external light, and
      emitting light in the at least partial band of the infrared light to the external object according to second optical power based on a second condition related to the intensity of the external light;
   receiving the light in the at least partial band of the infrared light which has been reflected from the external object; and
   as a part of an operation of receiving the light,
      receiving light in the at least partial band of the infrared light which has been reflected from the external object, according to a first exposure time based on the emitting of the light corresponding to the first optical power, and receiving light in the at least partial band of the infrared light which has been reflected from the external object, according to a second exposure time based on the emitting of the light corresponding to the second optical power.

12. The computer-readable recording medium of claim 11,
wherein the at least one operation further comprises storing designated information for determining the first condition and the second condition, and
wherein the designated information comprises:
  information on intensities of multiple external light rays;
  information on critical exposure times measured to correspond to the intensities of the multiple external light rays, respectively;
  information on optical power at a time point at which depth noise of an image enters a steady state, optical power being measured to correspond to the intensities of the multiple external light rays, respectively; and
  information on exposure times at the time point at which the depth noise of the image enters the steady state, the exposure times being measured to correspond to the intensities of the multiple external light rays, respectively.

13. The computer-readable recording medium of claim 12, wherein the first condition comprises a condition as to whether the first exposure time determined based on a detected intensity of the external light is longer than or equal to a critical exposure time stored to be included in the designated information.

14. The computer-readable recording medium of claim 13, wherein the at least one operation further comprises, when the first exposure time is shorter than the critical exposure time stored to be included in the designated information, generating depth information corresponding to the external object according to the first optical power and the first exposure time.

15. The computer-readable recording medium of claim 13, wherein the at least one operation further comprises, when the first exposure time is longer than or equal to the critical exposure time stored to be included in the designated information, generating depth information corresponding to the external object according to the second optical power and the second exposure time.

16. The computer-readable recording medium of claim 11, wherein each of the first optical power and the second optical power comprises optical power having a value obtained by reducing optical power corresponding to the intensity of the external light by a designated ratio among pieces of information on optical power.

17. The computer-readable recording medium of claim 11, wherein the second condition comprises a condition as to whether a critical ratio, which is a difference between the second exposure time determined based on the intensity of the external light and a critical exposure time stored to be included in designated information, is less than a designated critical ratio.

18. The computer-readable recording medium of claim 17, wherein the at least one operation further comprises, when the critical ratio is less than the designated critical ratio, generating depth information corresponding to the external object according to the first optical power and the first exposure time.

19. The computer-readable recording medium of claim 11, wherein the at least one operation further comprises generating depth information corresponding to the external object based on a pattern of the received light in the at least partial band of the infrared light.

* * * * *